United States Patent
Yeo

(10) Patent No.: US 10,913,503 B2
(45) Date of Patent: Feb. 9, 2021

(54) BIKE HAVING AUTOMATIC LANDING WHEEL APPARATUS

(71) Applicant: Tae Soon Yeo, Seoul (KR)

(72) Inventor: Tae Soon Yeo, Seoul (KR)

(*) Notice: Subject to any disclaimer, the term of this patent is extended or adjusted under 35 U.S.C. 154(b) by 176 days.

(21) Appl. No.: 15/575,378

(22) PCT Filed: Apr. 29, 2016

(86) PCT No.: PCT/KR2016/004533
§ 371 (c)(1),
(2) Date: Nov. 19, 2017

(87) PCT Pub. No.: WO2016/186341
PCT Pub. Date: Nov. 24, 2016

(65) Prior Publication Data
US 2018/0154965 A1    Jun. 7, 2018

(30) Foreign Application Priority Data

May 19, 2015  (KR) .................. 10-2015-0069588
Jul. 20, 2015  (KR) .................. 10-2015-0102588

(51) Int. Cl.
*B62H 1/12* (2006.01)
*B62J 17/08* (2020.01)
*B62J 27/00* (2020.01)
*B62J 17/04* (2006.01)
*B62H 1/02* (2006.01)
*B62K 25/04* (2006.01)
(Continued)

(52) U.S. Cl.
CPC .............. *B62H 1/12* (2013.01); *B62H 1/02* (2013.01); *B62H 1/14* (2013.01); *B62J 17/04* (2013.01);
(Continued)

(58) Field of Classification Search
CPC ..... B62H 1/12; B62H 1/02; B62H 1/14; B62J 17/04; B62J 17/08; B62J 27/00; B62J 99/00; B62K 25/04
(Continued)

(56) References Cited

U.S. PATENT DOCUMENTS 2,516,808 A    7/1950  Seger
4,203,500 A *  5/1980  Kamiya .................. B62H 1/12
                                                  180/219
(Continued)

FOREIGN PATENT DOCUMENTS

CN    202098498 U      1/2012
CN    20324234 U   *  11/2013
(Continued)

*Primary Examiner* — Jacob D Knutson
(74) *Attorney, Agent, or Firm* — Maschoff Brennan

(57) ABSTRACT

A bike having an automatic landing wheel apparatus includes a left landing wheel arm on the left side of the bike to vertically move a left landing wheel rotatably coupled to the lower end portion thereof. A right landing wheel arm on the right side of the bike vertically moves a right landing wheel rotatably coupled to the lower end portion thereof. A left driving unit drives the left landing wheel arm to move the left landing wheel upward and downward. A right driving unit drives the right landing wheel arm to move the right landing wheel upward and downward. A speed detection unit detects the speed of the bike. A controller is connected with the speed detection unit, the left driving unit, and the right driving unit to move the left and right landing wheels upward or downward in response to the detected speed of the bike.

13 Claims, 21 Drawing Sheets

(51) Int. Cl.
*B62H 1/14* (2006.01)
*B62J 99/00* (2020.01)
*B62K 19/46* (2006.01)
*B62J 17/086* (2020.01)
*B62J 45/00* (2020.01)
*B62J 45/20* (2020.01)
*B62J 45/40* (2020.01)
*B62J 50/16* (2020.01)
*B62K 13/00* (2006.01)
*B62L 3/04* (2006.01)

(52) U.S. Cl.
CPC ............... *B62J 17/08* (2013.01); *B62J 27/00* (2013.01); *B62J 99/00* (2013.01); *B62K 25/04* (2013.01); *B62J 17/086* (2020.02); *B62J 45/00* (2020.02); *B62J 45/20* (2020.02); *B62J 45/40* (2020.02); *B62J 50/16* (2020.02); *B62K 13/00* (2013.01); *B62K 19/46* (2013.01); *B62L 3/04* (2013.01)

(58) Field of Classification Search
USPC .......................................................... 280/296
See application file for complete search history.

(56) References Cited

U.S. PATENT DOCUMENTS

| | | | | |
|---|---|---|---|---|
| 4,961,477 A * | 10/1990 | Sweeney | ................... | A61G 3/06 180/209 |
| 5,904,218 A * | 5/1999 | Watkins | ................. | B62D 61/02 180/209 |
| 5,904,392 A * | 5/1999 | Mainwal | ................... | B62J 17/00 180/219 |
| 6,213,237 B1 * | 4/2001 | Willman | ................... | B62H 1/12 180/209 |
| 6,637,763 B2 * | 10/2003 | Kuo | ......................... | B62H 1/12 280/209 |
| 7,396,033 B2 * | 7/2008 | Murata | ..................... | B62J 27/00 280/293 |
| 8,235,419 B1 * | 8/2012 | Giarrusso | .............. | B62K 11/06 280/296 |
| 8,246,078 B2 * | 8/2012 | Yun | ........................... | B62J 27/00 280/755 |
| 10,399,623 B2 * | 9/2019 | Yeo | .......................... | B62J 17/04 |
| 2009/0250899 A1 * | 10/2009 | Nethery | .................... | B62H 1/02 280/298 |
| 2018/0154966 A1 * | 6/2018 | Yeo | .......................... | B62H 1/02 |

FOREIGN PATENT DOCUMENTS

| | | |
|---|---|---|
| JP | 61-161080 | 6/1986 |
| KR | 10 2009 0061320 A | 6/2009 |
| KR | 10-2009-0061320 A | 6/2009 |
| KR | 10-2009-0053379 A | 12/2010 |
| KR | 10 2010 0134988 A | 12/2010 |
| KR | 10-2010-0134988 A | 12/2010 |
| KR | 10 2012 0010509 A | 2/2012 |
| KR | 10-2012-0010509 A | 2/2012 |
| KR | 10-2013-0127718 A | 11/2013 |
| KR | 10 2014 0035679 A | 3/2014 |
| KR | 10-2014-0035679 A | 3/2014 |

* cited by examiner

Pendulum
47

BIKE HAVING AUTOMATIC LANDING WHEEL APPARATUS

TECHNICAL FIELD

The present invention relates to a bike, and more particularly, to a bike equipped with a canopy and an automatic landing wheel apparatus capable of ensuring maneuverability and flexibility and improving stability, thereby enabling comfortable riding for people from a wide range of ages.

BACKGROUND ART

An auxiliary wheel device for a two-wheeled vehicle disclosed in Korean Patent Application Publication No. 10-2014-0030005 is capable of preventing the vehicle from falling over and improving travel stability. The auxiliary wheel device includes a damping unit connecting a body of the two-wheeled vehicle to an auxiliary wheel and providing a damping force for attenuating impact that would otherwise be transmitted to the body through the auxiliary wheel, and a blocking unit selectively blocking the operation of the damping unit by an external operation of a user, wherein the user is allowed to selectively operate the damping unit through the external operation according to a driving condition However, as the bike cannot stay balanced when stopped, the auxiliary wheel device for the two-wheeled vehicle is considered a limited technology that does not exhibit a remarkably improved technical effect compared to a stand that supports the bike. Even if this technology is applied, it may fail to maintain the bike at the upright position due to unevenness of the ground and strong force applied to the left side or right side of the bike, or the inconvenience caused to the bike riders by this technology may be greater than convenience provided to the bike riders when mounted on the bike. Further, when an unexpected strong shock is applied to the auxiliary wheels or the auxiliary wheels hit a relatively large obstacle, there is a risk that the bike will be overturned by the shock applied to the auxiliary wheels.

In the case of the automatic motor-driven stand apparatus having auxiliary wheels for safe driving assistance of a two-wheeled vehicle disclosed in Korean Patent Application Publication No. 10-2010-0134988, when the two-wheel vehicle enters a low-speed driving mode, in which it is difficult to balance the body of the two-wheeled vehicle, the auxiliary wheels are unfolded to aid in safe driving while maintaining the upright position of the body. In addition, the auxiliary wheels are designed to enhance stability in balancing the body when the two-wheeled vehicle travels along a road which is inclined to the left or right. To this end, the stand apparatus is arranged to support two points at both sides of a wheel of the two-wheeled vehicle and includes left and right auxiliary wheels rotatably mounted to support the two points. The left and right auxiliary wheels are automatically operated to contact the ground and support the body in an upright position when the vehicle speed is lower than a set vehicle speed and are controlled to be automatically folded to a horizontal position when the vehicle speed is higher than the set vehicle speed.

However, even this technology may fail to maintain the bike in the upright position due to unevenness of the ground and strong unbalancing force applied to the left side or right side of the bike or may cause inconvenience to the bike riders. In particular, when an unexpected strong shock is applied to the left and right auxiliary wheels or the auxiliary wheels hit a relatively large obstacle, there is a risk that the two-wheeled vehicle will be overturned by the shock applied to the auxiliary wheels. In addition, when the left side and the right side of the ground are at different heights, the auxiliary wheels must be individually supported on the ground according to the difference in height. This operation solely depends on the springs while the auxiliary wheels are driven at the same height in the forward and reverse directions simultaneously by using a wire and a transport means. Even if the auxiliary wheels are operated during travel, the horizontally balanced bike may become significantly unstable due to imbalance between the left and right sides of the ground. In other words, this technology fails to resolve lateral imbalance, and may require spring tension control to maintain balance. However, a variable spring tension mechanism may result in excess complexity and the document only discloses that the auxiliary wheels are raised when the inclination is inappropriate. If the auxiliary wheels are raised in this way, a motorcycle may be overturned immediately.

Korean Patent Application Publication No. 10-2013-0127718 discloses an auxiliary wheel device for a bike capable of effectively absorbing impact to provide stable ride comfort and to improve driving stability. The auxiliary wheel device includes an auxiliary wheel portion rotatably connected to the body of the bike, a shock absorbing portion for attenuating impact applied to the body of the bike via the auxiliary wheel portion, and a stopper portion for temporarily restricting rotation of the auxiliary wheel portion with respect to the body of the bike, wherein the restriction imposed by the stopper portion is released and the auxiliary wheel portion rotates with respect to the body of the bike when an impact greater than the impact that the shock absorbing portion can bear is applied to the auxiliary wheel portion.

However, the disclosed technology is merely a small and simple mechanism that is used to sense or check the length and height of a product on a small conveyor belt or a counter. The disclosed technology needs to be improved to support a greatly varying load for balancing the bike and to be applied to a vehicle which moves over uneven terrain and undergoes large impact from the ground during travel. The basic design frame of this technology is not suitable for a bike whose center of gravity severely shifts laterally and which is very likely to be laterally inclined with an excessive load. Further, the technology fails to secure stability against change of the ground without hindering open autonomy of the rider's driving.

Although the two-wheeled bike provides open driving autonomy and better maneuverability compared to the four-wheeled vehicle and thus exposes the riders to many risks, bike lovers are growing in number. Due to the nature of bikes, bikes require a lot of technologies to achieve the inherent purpose of mounting the auxiliary wheels while meeting mobility and flexibility and securing better safety. However, the conventional auxiliary wheel apparatuses may impose restrictions on the bike rider's autonomy or have no remarkable improvement except the function of assisting and supporting the conventional stand. Although there are some advanced technologies, they are not preferred by the bike riders as they are not sufficiently controlled in response to independent lateral change in angle.

DISCLOSURE

Technical Problem

Therefore, the present invention has been made in view of the above problems, and it is one object of the present invention to provide a bike having an automatic landing wheel apparatus that is capable of supporting unique mobility and flexibility of the bike, maintaining the bike in the upright position during travel or stoppage of the bike to secure stability matching that of a four-wheeled vehicle, preventing slippage on icy roads or snow-covered roads to enhance rectilinear movement, effectively attenuating shock even on irregular ground to enhance ride comfort and stability, and providing an inner space similar to that of a four-wheeled vehicle to eliminate the inconvenience of wearing a helmet and ensuring safety in the event of collision.

Technical Solution

In accordance with one aspect of the present invention, provided is a bike having an automatic landing wheel apparatus including: a left landing wheel arm provided at a left side of the bike and having a lower end portion rotatably coupled with a left landing wheel to move the left landing wheel up and down; a right landing wheel arm provided at a right side of the bike and having a lower end portion rotatably coupled with a right landing wheel to move the right landing wheel up and down; a left drive unit configured to drive the left landing wheel arm to raise and lower the left landing wheel; a right drive unit configured to drive the right landing wheel arm to raise and lower the right landing wheel; a speed sensor configured to sense a speed of the bike; and a controller connected to the speed sensor, the left drive unit and the right drive unit to raise both or one of the left landing wheel and the right landing wheel when a speed sensed by the speed sensor exceeds a set speed and to lower both or one of the left landing wheel and the right landing wheel when the speed sensed by the speed sensor becomes the set speed or less.

Preferably, the left landing wheel arm has an upper end portion rotatably mounted on a left side portion of the bike so as to vertically rotate about a shaft extending in a horizontal direction, and the right landing wheel arm has an upper end portion rotatably mounted on a right side portion of the bike so as to vertically rotate about a shaft extending in a horizontal direction, wherein the left drive unit is configured to rotate the left landing wheel arm in forward and reverse directions, and the right drive unit is configured to rotate the right landing wheel arm in forward and reverse directions.

Preferably, the bike is provided with a canopy having a space for accommodating a driver, wherein each of both side parts of a rear portion of the canopy includes a side trunk providing a storage space for the automatic landing wheel apparatus.

Preferably, a front portion of the canopy includes: a windshield having an outer surface matching an outer surface of a part of a spherical body; a pair of left and right windshield wipers curved in an arc shape so as to come into close contact with the outer surface of the windshield; and a windshield wiper driving means configured to drive the windshield wipers to reciprocate up and down.

The drive unit may include: a cam configured to receive driving force of a landing motor capable of rotating in forward and reverse directions and to rotate about a horizontal shaft to push and lower the landing wheel arms; and a pull spring configured to pull the landing wheel arms to raise the landing wheel arms when a shortest distance between a rotation center of the cam and the cam and the landing wheel arms is reduced.

The drive unit may include: an air cylinder device capable of raising or lowering a piston rod according to an electric signal, the air cylinder device being configured to lower the landing wheel arms when the piston rod is lowered to push the landing wheel arms; and a pull spring configured to pull the landing wheel arms to raise the landing wheel arms when the piston rod rises.

Each of the landing wheel arms may have a bent portion having a part bent to have an L shape or a C shape between an upper end portion and a lower end portion of the bent portion, wherein an inside part of the bent portion may be provided with a shock absorbing means such that the shock absorbing means contacts the cam.

Each of the landing wheel arms may have a bent portion having a part bent to have an L shape or a C shape between an upper end portion and a lower end portion of the bent portion, wherein an inside part of the bent portion may be provided with a shock absorbing means such that the shock absorbing means contacts the piston rod.

The shock absorbing means may be a leaf spring having one end coupled to a corresponding one of the landing wheel arms and an opposite end, the opposite end being a free end.

The leaf spring may have a plurality of leaf springs arranged in parallel.

The shock absorbing means may include: a leaf spring having an upper end portion hinged to the upper end of a corresponding one of the landing wheel arms, the leaf spring being formed in a curved shape along a curvature of the corresponding one of the landing wheel arms; and a coil spring having an upper end coupled to a lower end portion of the leaf spring and a lower end coupled to the corresponding one of the landing wheel arms, the coil spring being elastically arranged between the leaf spring and the corresponding one of the landing wheel arms.

Preferably, the bike further includes an automatic upright position control/maintenance system configured to measure a degree of inclination of the bike to a left side or a right side with respect to an upright position of the bike, wherein the automatic upright position control/maintenance system and the controller are connected to each other, wherein the controller lowers only the left landing wheel when the bike is inclined to the left side by a predetermined angle or more and lowers only the right landing wheel when the bike is inclined to the right side by the predetermined angle or more.

Preferably, when the bike is further inclined to the left side by a preset angle after the left landing wheel is lowered according to inclination of the bike to the left side by the predetermined angle or more, the controller raises the right landing wheel, wherein, when the bike is further inclined to the right side by the preset angle after the right landing wheel is lowered according to inclination of the bike to the right side by the predetermined angle or more, the controller raises the right landing wheel.

Preferably, the automatic upright position control/maintenance system includes: a pendulum coupled to a rotation shaft so as to be freely rotatable left or right and kept positioned on a vertical line even if the bike is tilted by a weight thereof; an electrode rod coupled to the pendulum to move together with the pendulum; a center electrode plate fixedly installed on the bike so as to contact the electrode rod when the bike is positioned upright; and an electrode substrate arranged in series on a left side or right side of the center electrode plate and fixedly installed on the bike to make a contact with the electrode rod when the bike is inclined leftward and rightward by a certain angle or more, wherein the electrode rod contacts the center electrode plate within a certain range of inclination with respect to an upright position of the bike, wherein the electrode substrate includes a plurality of electrode substrates, and the electrode substrate contacting the electrode rod varies among the plurality of electrode substrates according to a degree of inclination of the electrode rod, such that a degree of inclination of the bike is identified.

Preferably, the automatic landing wheel apparatus includes a left landing wheel apparatus and a right landing wheel apparatus, wherein the left landing wheel apparatus includes the left landing wheel arm and the left landing wheel, and is coupled to a guide linearly movable to the left or right through the left side trunk so as to move to the left or right, wherein the right landing wheel apparatus includes the right landing wheel arm, the right landing wheel, and the right drive unit, and is coupled to a guide linearly movable to the left or right through the right side trunk so as to move to the left or right.

Preferably, a left rack is coupled to a right side of the left landing wheel apparatus and a right rack is coupled to a left side of the right landing wheel apparatus, wherein the automatic landing wheel apparatus includes a pinion engaging with the left rack and the right rack, and a motor configured to drive the pinion, wherein the motor is driven to bring the left landing wheel apparatus and the right landing wheel apparatus close to or away from each other at the same time.

Advantageous Effects

As apparent from the foregoing, the present invention advantageously provides a bike having the automatic landing wheel apparatus including a canopy. Thereby, the bike may protect the rider's body from rain, snow, cold, heat, etc., prevent accidents by automatically or manually maintaining the upright position of the two-wheeled vehicle during travel without causing the rider to laboriously use the rider's body to maintain the upright position of the two-wheeled vehicle, and implementing the aforementioned functions at low cost by installing an automatic landing wheel in the trunk of the canopy while remarkably reducing air resistance through a streamlined shape.

According to the present invention, the left and right landing wheels support the bike with the same magnitude of force under a normal road travel condition, and rise upward at a travel speed higher than a predetermined speed to allow efficient driving during high speed travel, and the landing wheel arms are flexibly operated so as not to deteriorate the characteristics of the bike such that the shock transmitted to the body is absorbed when the bike travels on uneven terrain at low speed with the landing wheels deployed. Thereby, safety may be ensured, and flexible driving may be implemented.

In addition, under harsh driving conditions such as severe road surface unevenness and a slippery road surface, a flexible working arm can operate so as to be adapted to external uneven terrain through operation of a control system that complements operation of a mechanism using a simple multi-leaf spring and coil spring mounted on an automatic mechanical C- or L-shaped arm. Thereby, the impact force on the uneven terrain can be effectively absorbed to ensure stable riding. Further, the function of maintaining the upright position of the bike during travel is not limited, and a flexible and strong function of a stand can be implemented. Therefore, heavy bikes can be easily operated even by the elderly and women. In addition, the user can set the operation of the landing wheel arm selectively to the automatic mode or the manual mode depending on driving conditions. Accordingly, more stable and dynamic driving can be implemented according to driving conditions.

In addition, the functions of preventing slippage and maintaining the balance and automatically maintaining the upright position can be stably performed by an extendable ski device which can be detachably attached to the landing wheel arm. Thereby, straightforward movement of the bike can be enhanced, and thus more stable driving can be implemented.

Due to the open autonomy, dynamic maneuverability, speed, and excellent mobility on narrow roads as provided to riders of the two-wheeled bike, the number of bike enthusiasts is increasing although bikes are weaker than four-wheeled vehicles in terms of safety and users are exposed to many risks of serious injury.

Accordingly, there is a need to secure safety above all else while satisfying the mobility and flexibility unique to the bike. With the apparatus according to the present invention, safety as high as that of a four-wheeled vehicle can be secured, while maintaining mobility and flexibility unique to bikes. Further, as an inner space surrounded by the canopy is provided, convenience as provided by four-wheeled vehicles can be provided in very cold weather and extreme hot weather, and inconvenience of wearing a helmet can be eliminated. In addition, women and the elderly can easily operate medium-sized bikes.

Description of Reference Numerals

| | |
|---|---|
| 6: Camshaft | 7: Landing wheel arm |
| 8: Drive shaft | 10: Pinion |
| 11: Rack | LM: LM Guide |
| 14: Generator combined motor | HL: Hand lever |
| 15: Wire | 19: Leaf spring |
| 24: Cam case | 25: Landing wheel |
| 29: Rotating wheel | 31: Landing motor |
| 35: Reduction gear unit | 35a: Driven gear |
| 35b: Driving gear | 38: Speedometer |
| 39: Solenoid | 42: Electrode substrate |
| 43: Electrode rod | 45: Center electrode plate |
| 47: Pendulum | 51: Relay |
| 51a: ON contact portion | 51c: Coil |
| 55: Landing wheel switch | 55c: Transfer contact portion |
| 56-1: Extension switch | 57-1: Contract switch |
| 57: Limit switch | 58t: Throttle switch |
| 59: Forced landing switch | 60: Fuse |
| 68: Ski landing switch | 92: NC contact portion |
| 101: Front wheel back-and-forth drive accelerator | |
| 175: Air tank | 179: Connecting cam |
| 180: Drive wheel | 181: Compressor support |
| 240: Cylinder | 245: Intake port |
| 246: Exhaust port | 248: Connecting rod |
| 250: Cam | 251: Pull spring |
| 252: Side trunk | 253: Rear wheel drive shaft pulley |
| 350, 351: Window Brush | 360: Reducer |
| 361: Shaft | 370: Brush motor |
| 380: Bike skis | 381: Ski mount socket |
| 382: Detachable lever | eb: Foot deceleration pedal |
| bk: Brake | |

BEST MODE

Hereinafter, specific embodiments of the present invention will be described in detail with reference to the accompanying drawings.

FIGS. 1A to 1I show a bike provided with a canopy enclosing the whole bike. As the canopy is mounted on the entire bike, and the rider's foot cannot reach the ground when the door is closed, the rider cannot use his/her legs to maintain the upright position of the bike. For this reason, a pair of left and right automatic landing wheels 25 contacts the ground to keep the bike upright when the bike stops or travels.

Figure 8A:
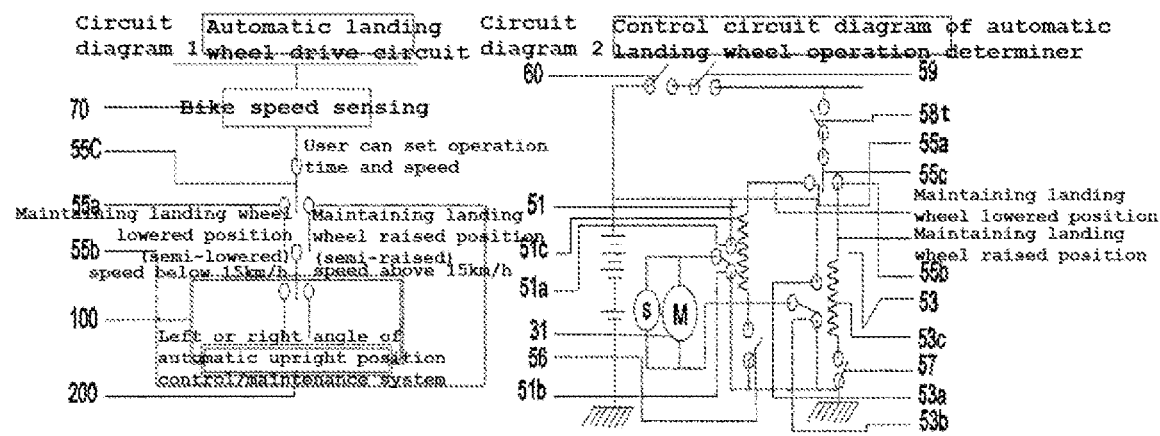
FIGS. 8A and 8B are operational circuit diagrams of a bike having an automatic landing wheel apparatus according to the present invention.
Figure 8B:
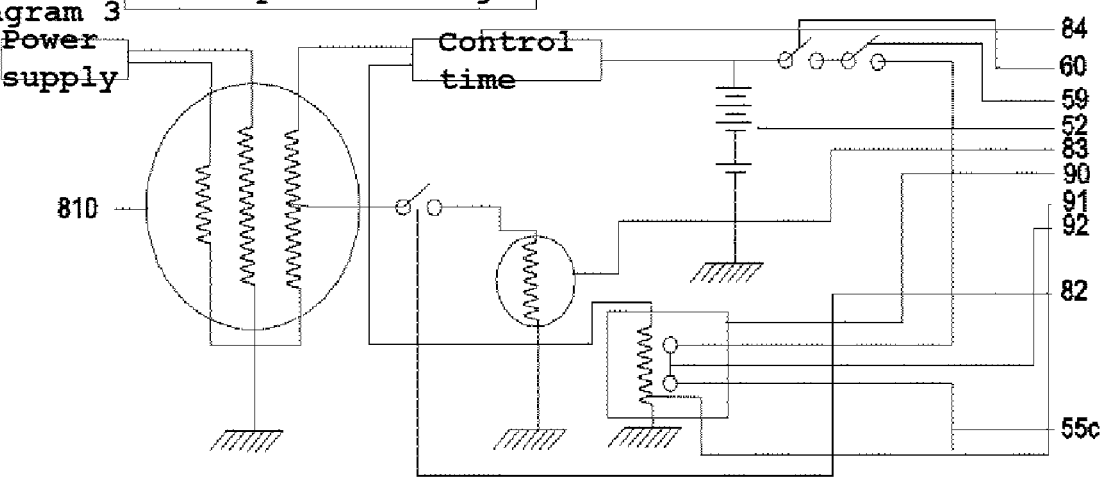

In contrast with the conventional cases where the upright position of the bike was supported by the rider's legs, the bike can be stopped or moved while the landing wheels 25 are controlled to contact the ground by an automatic upright position maintenance circuit of FIGS. 8A and 8B. When the landing wheels 25 are in the automatic mode, the occupant can travel like travel in a four-wheeled vehicle, and thus does not need to make an effort to keep the bike upright.

The present invention provides an apparatus having left and right landing wheels 25 that are independently driven to be lowered to ensure safe driving with the body of a two-wheeled vehicle kept upright when two-wheeled vehicle travels at a low speed at which it is difficult to balance the two-wheeled vehicle. The apparatus is provided with an automatic upright position control/maintenance system for enhancing stability of the center of gravity of the vehicle body when the two-wheeled vehicle travels along a laterally inclined road.

The left and right landing wheels 25 are controlled by the automatic upright position control/maintenance system to maintain the upright position of the vehicle body by automatically contacting the ground when the vehicle speed is below a set vehicle and to automatically rise to a safe position and automatically respond to uneven terrain when the vehicle speed is above the set vehicle speed.

Figure 1A:
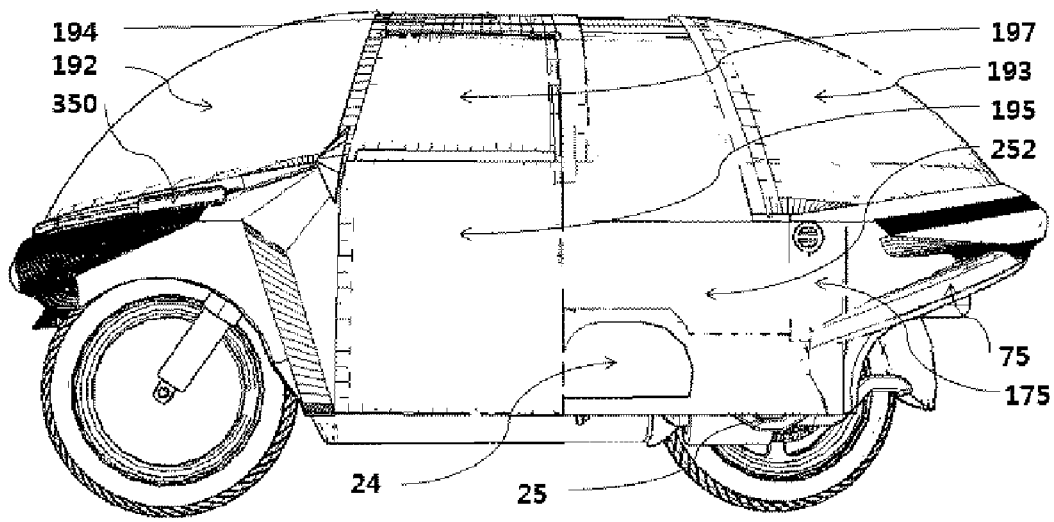
FIGS. 1A and 1B are side views showing a bike having an automatic landing wheel apparatus according to the present invention.

When the two-wheeled vehicle is driven at a high speed, the two-wheeled vehicle as shown in FIG. 1A consumes less energy than a four-wheeled vehicle, and thus has excellent efficiency, and the rider can enjoy typical sensation of speed provided by two-wheeled vehicles. In addition, when the speed decreases below 15 km/h, the landing wheels 25 are semi-landed so as not to cause inconvenience in autonomous driving of the driver who is flexible regarding centripetal force and centrifugal force and so as to achieve a safe landing angle, which is a basic anti-rollover angle in case of emergency. Thus, the two-wheeled vehicle provides the driver with flexibility in driving without turning over. Semi-landing refers to a state in which the automatic landing wheels 25 float slightly above the ground without touching the ground while the bike maintains the upright position.

Figure 2A:
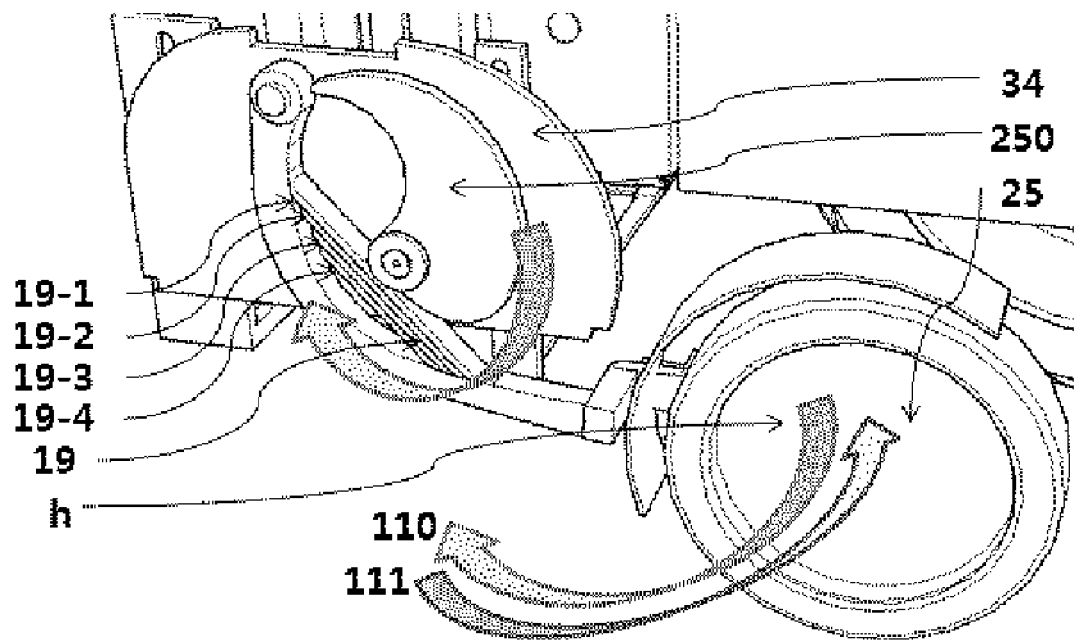
FIGS. 2A, 2B, and 2D are perspective views showing an automatic landing wheel apparatus provided to a bike according to a first embodiment of the present invention.
Figure 2B:
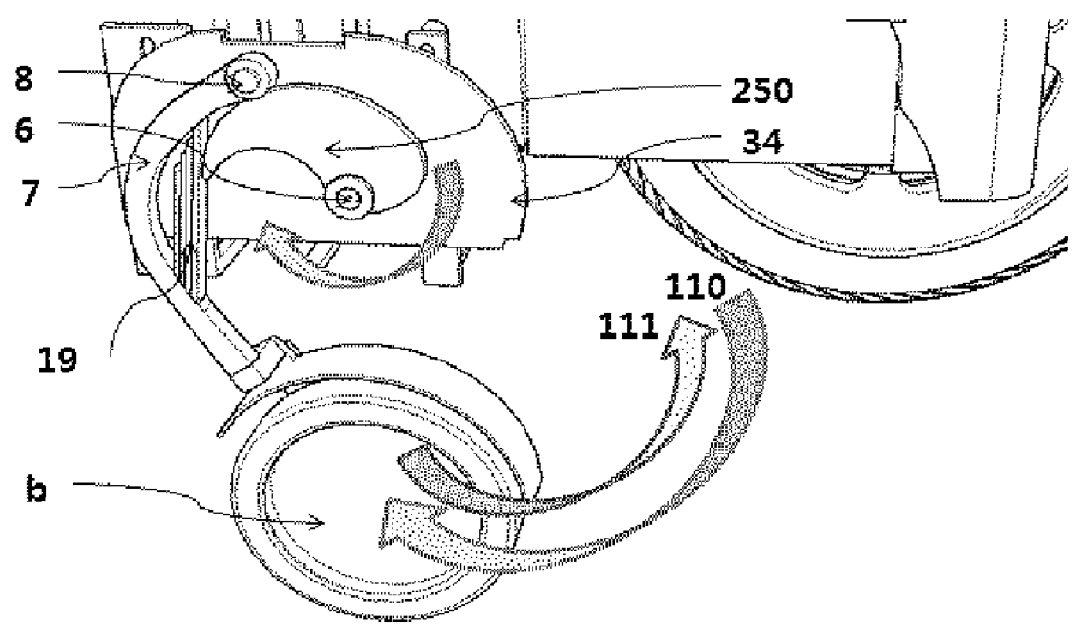

Whether or not to land the landing wheels and the duration of landing are determined by a speed sensing circuit of FIG. 8B. In FIG. 2D, when the cam is at position a, the landing wheels are in a semi-landing state, and the bike is flexibly supported by spring tension so as not to turn over even if the bike tilts to one side. In addition, the ground-responsive automatic upright position control/maintenance system using gravity as shown in FIGS. 3A to 3D automatically maintains the safe landing angle.

When the bike travels at 0 to 5 km/h and is thus almost stationary or is fully stopped, the landing wheels 25 are controlled to completely land on the ground.

Figure 2C:
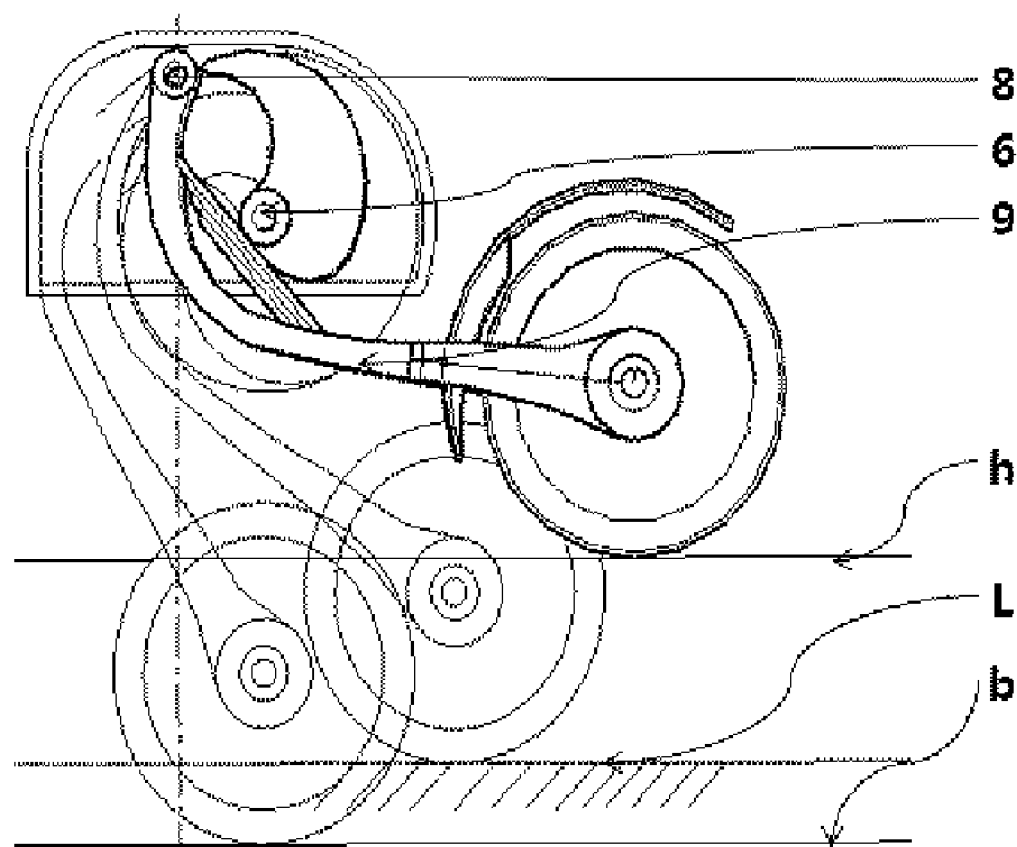
FIG. 2C is a side view showing the automatic landing wheel apparatus provided to a bike according to the first embodiment of the present invention.
Figure 2D:
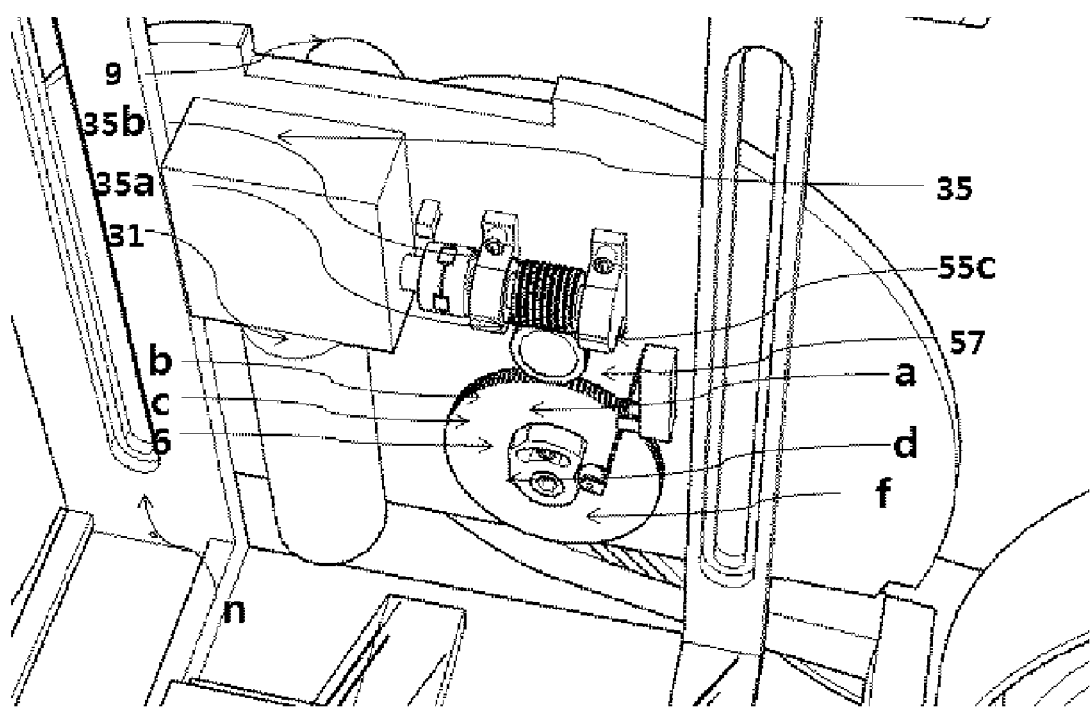

When the speed increases above 15 km/h, the landing wheels 25 in the semi-landing state in which the automatic landing wheels 25 float slightly above the ground preliminarily rise such that the lower ends of the landing wheels 25 are positioned on line h in FIG. 2C. At the preliminarily raised position, the landing motor 31 is in the ON state. However, when the speed increases above 60 km/h, the landing wheels 25 are maintained at the fully raised position. At this time, the landing motor 31 is turned off.

Figure 5A:
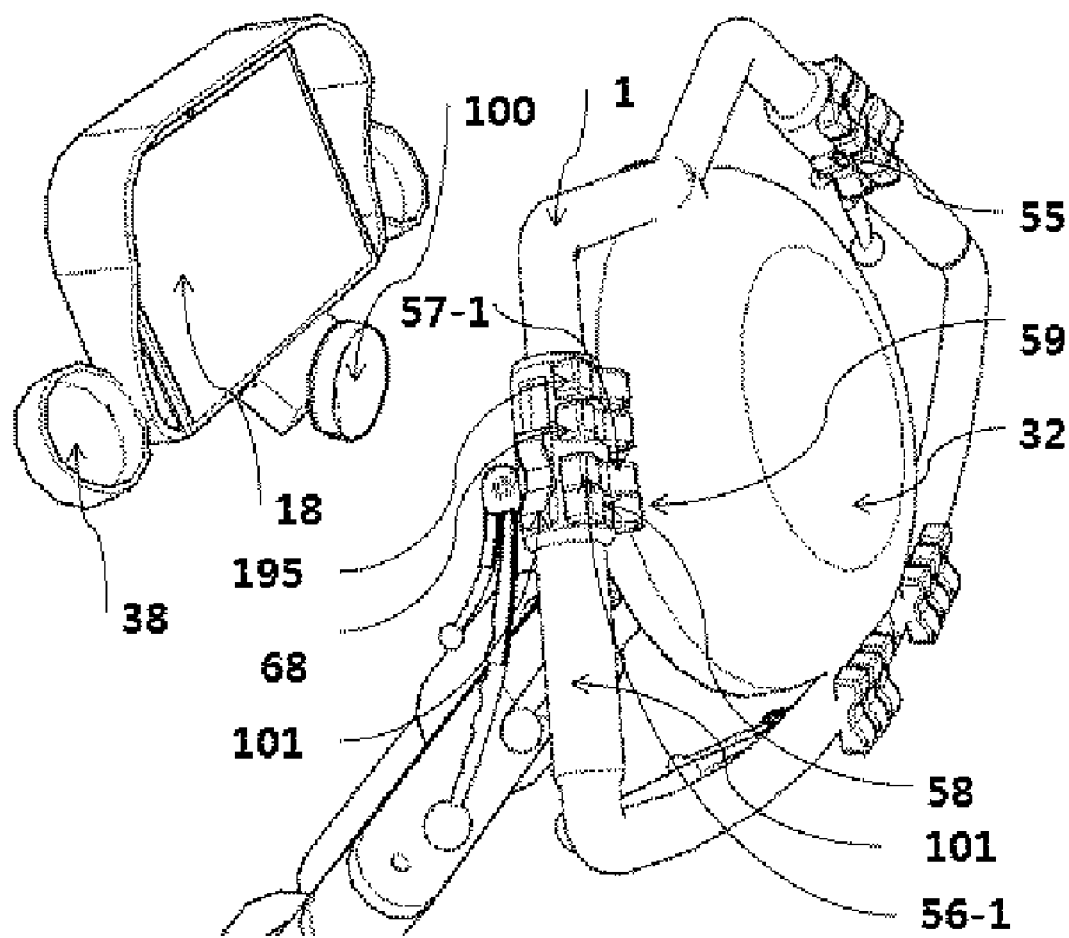
FIG. 5A is a perspective view illustrating a control unit of a bike having an automatic landing wheel apparatus according to the present invention.

When the user switches the forced landing switch 59 shown in FIG. 5A to the downward position, the semi-landing or preliminary rising state is maintained only at 60 km/h or less. At a speed above 60 km/h, full rise is realized, thereby enhancing stability of high-speed travel.

The speedometer 38 shown in FIG. 5A transmits a signal to the speed sensing circuit when the speed of the bike reaches a predetermined value. In FIG. 8B, when the speed of the bike is greater than or equal to 60 km/h, the output voltage of the lamp coil 810 becomes greater than or equal to a predetermined value, and the relay 90 controls the NC contact portion 92 to maintain the full rise. In this state, the landing motor 31 is turned off, and the landing wheel 25 is not operated to descend.

When the bike speed decreases, the output voltage of the lamp coil 810 also decreases. When the output voltage drops below a predetermined value to release the relay 90, the NC contact portion 92 allows the landing motor 31 for driving the landing wheel arm 7 to become operable.

Circuit diagram 2 of FIG. 8A shows a control circuit of the landing motor 31 for driving the landing wheels 25. One lead of the landing motor 31 is connected to the positive terminal of a battery through the ON contact portion 51a of the relay 51 and the negative terminal of the battery is grounded through the body of the contact portion. The other lead of the landing motor 31 is connected to the positive terminal of the battery 52 through the ON contact portion 53a of the relay 53 and is connected to the negative terminal of the battery through the NC contact portion 53b of the relay 53.

One end of the coil 51c of the relay 51 is connected to the contact portion 55a of the landing wheel switch 58 to pivot the landing wheel 25 to the landing position, and the other end of the coil is connected to the limit switch 57, which determines when the stand is in the extended position. In contrast, one end of the coil 53c of the relay 53 is connected to the transfer contact portion 55b of the landing wheel switch 58 to pivot the stand to the raised position, and the other end of the coil is connected to the negative terminal of the battery 52 through the limit switch 57, which determines when the stand is in the raised position. The transfer contact portion 55c of the landing wheel switch 58 is connected to the positive terminal of the battery via the throttle switch 58, the forced landing switch 59 and the fuse 60.

As shown in FIG. 5A, the landing wheel switch 58 is located in the steering wheel switch bundle for easy access by the driver and regulates the operation of the landing wheel 25. The rotated position of the cam 250 in FIG. 2D is sensed using the limit switch 57 or an attachable proximity sensor.

Figure 1B:
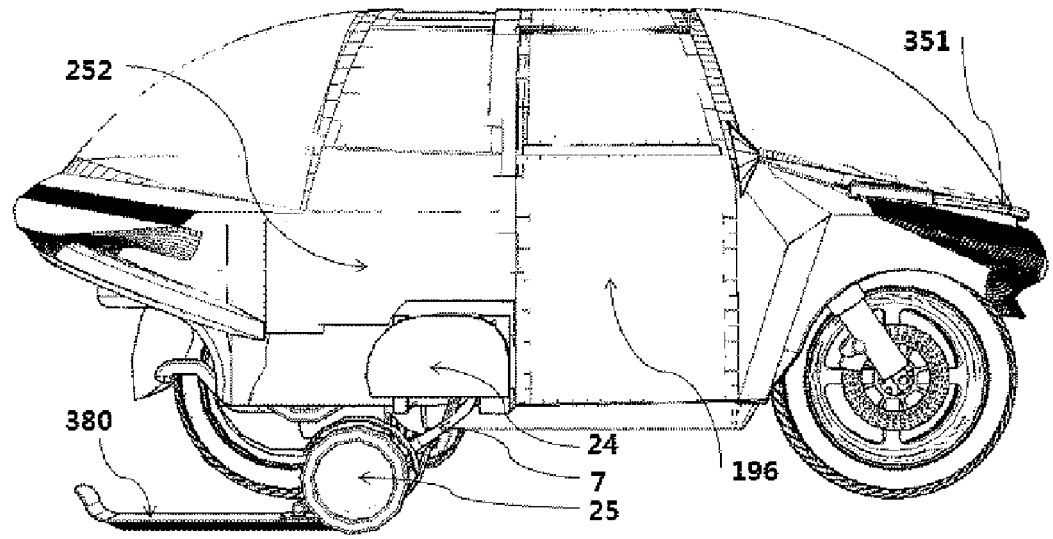
Figure 1C:
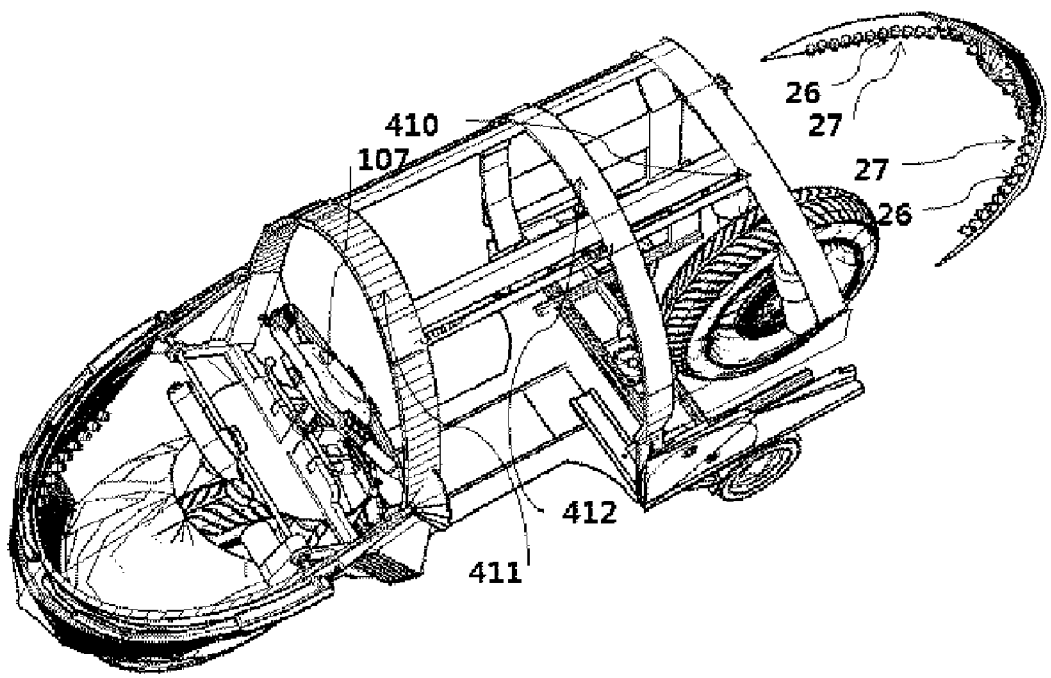
FIGS. 1C to 1E, 1G and 1I are perspective views showing a bike having an automatic landing wheel apparatus according to the present invention.
Figure 1D:
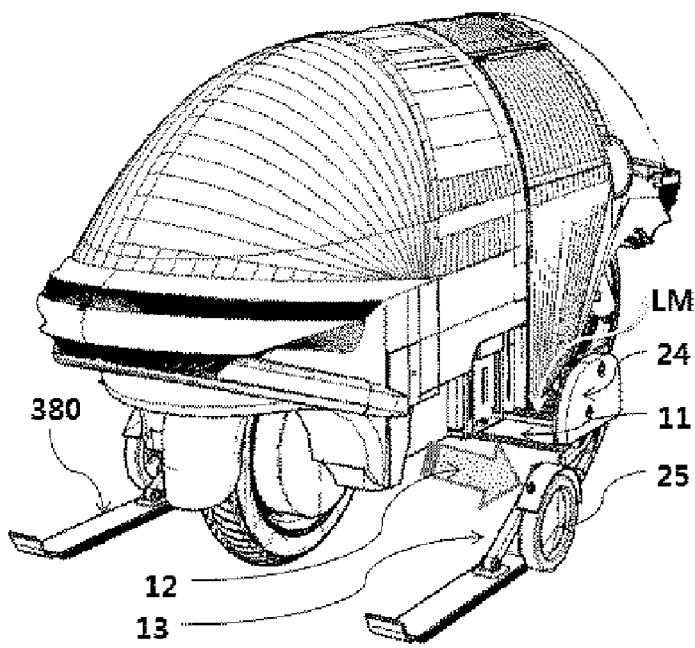
Figure 1E:
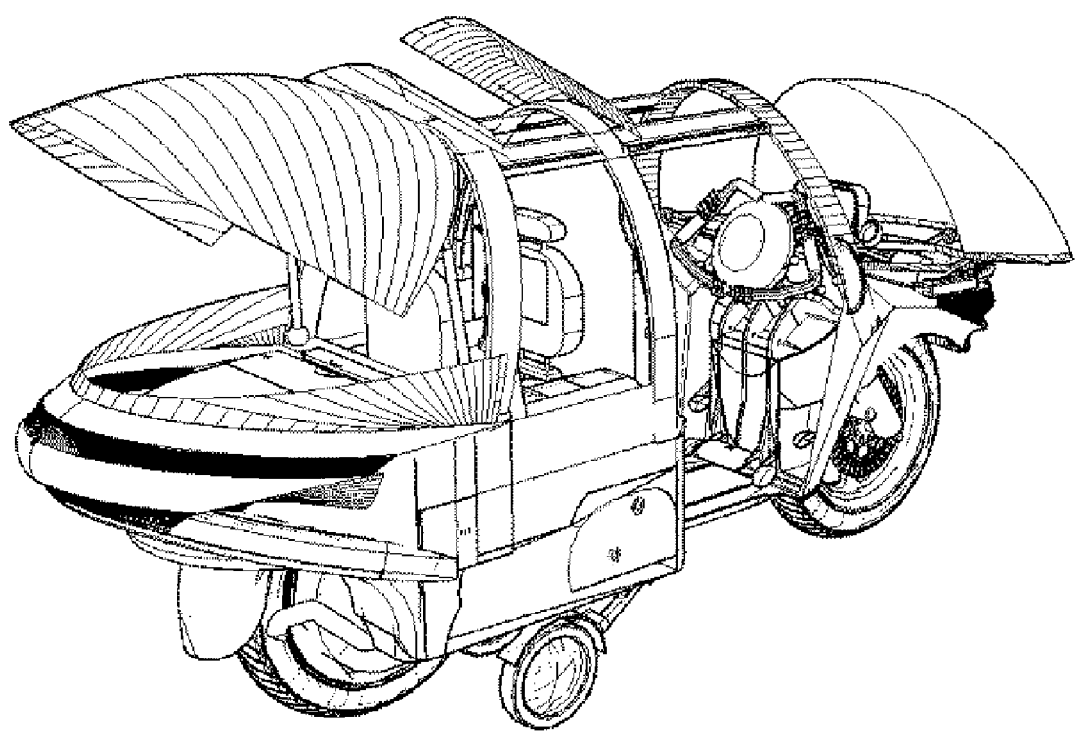
Figure 1F:
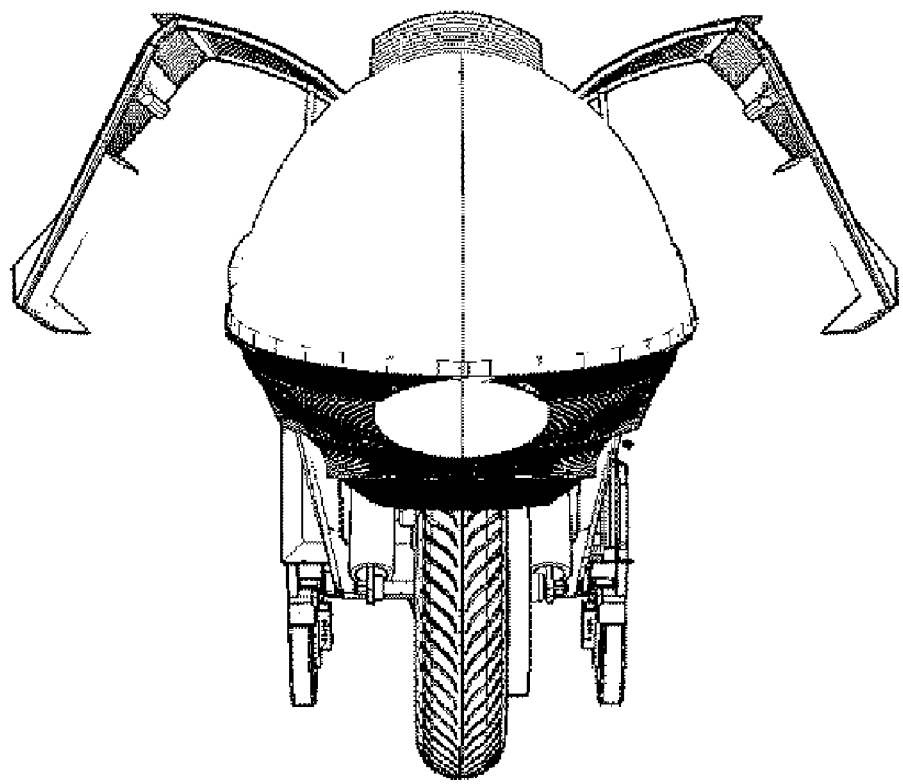
FIG. 1F is a rear view showing a bike having an automatic landing wheel apparatus according to the present invention.
Figure 1G:
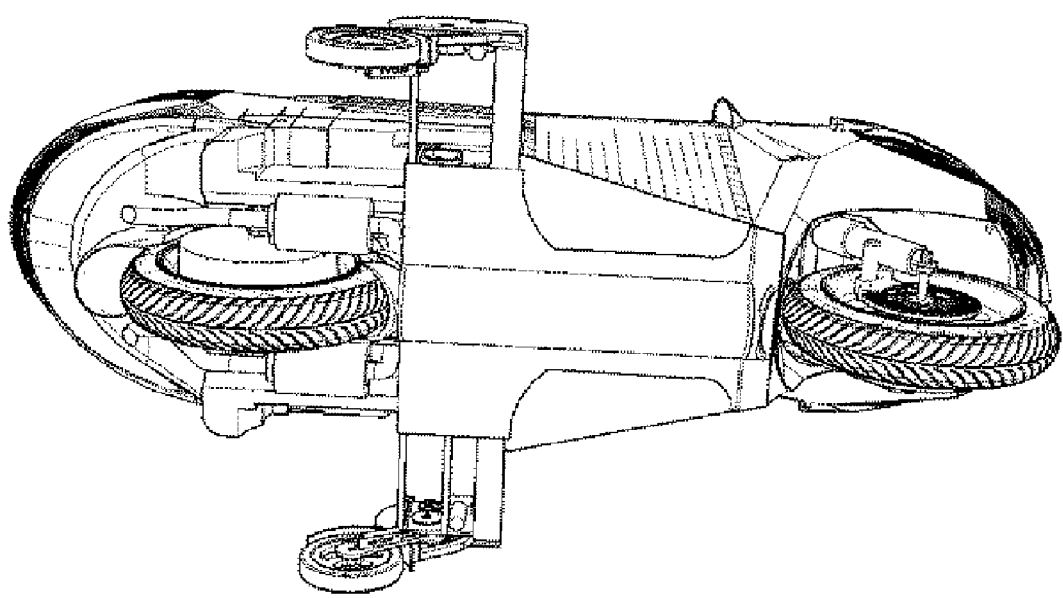
Figure 1H:
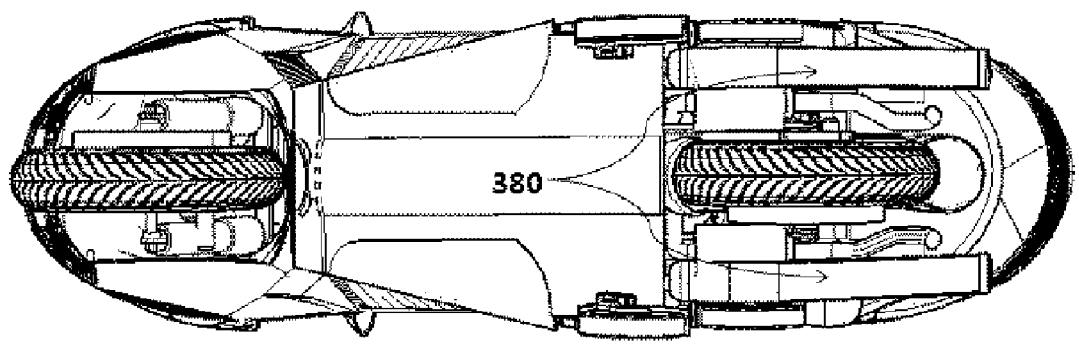
FIG. 1H is a bottom view showing a bike having an automatic landing wheel apparatus according to the present invention.
Figure 1I:
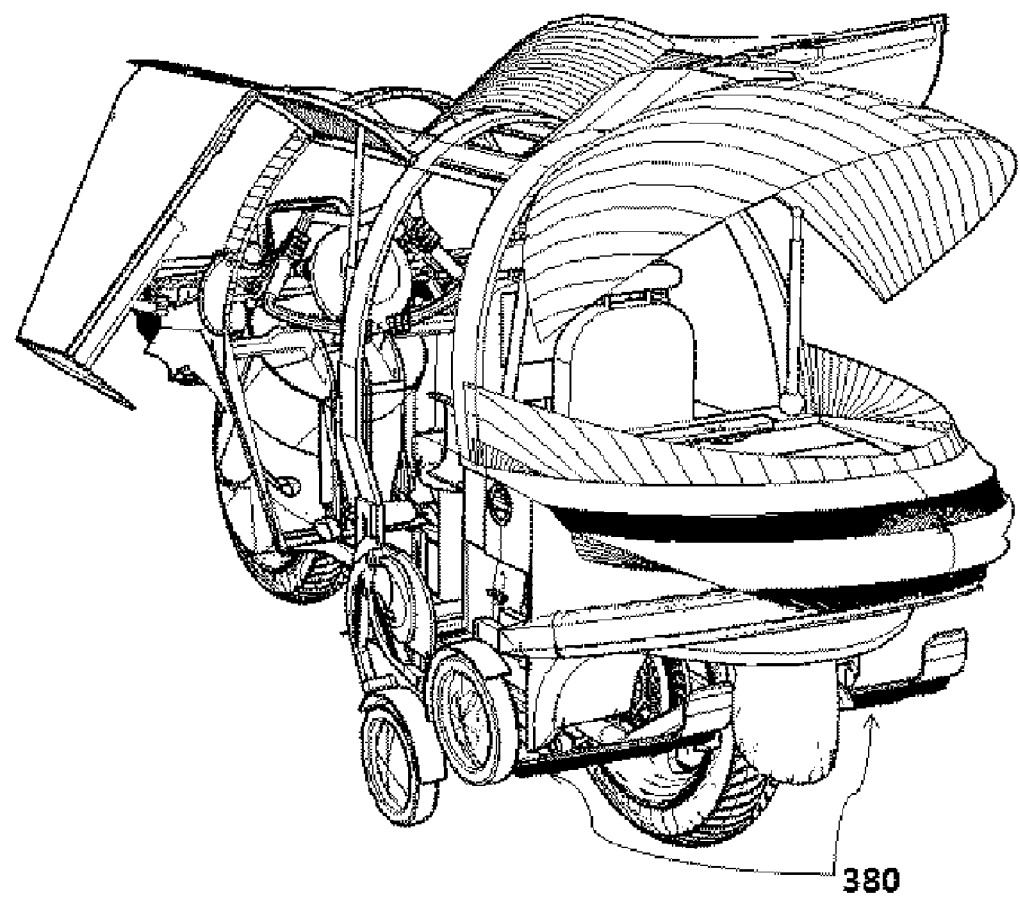

The limit switch 57 and the drive gear 35b, which is rotatably installed, are provided inside the cam case 24 in FIG. 1D. When the landing wheels 25 are fully landed on the ground, the limit switch 57 is turned off by touching the portion c of FIG. 2D. The limit switch 57 is also turned off by touching the portion d of FIG. 2D when the landing wheels 25 are fully raised.

The extension switch 56-1 of FIG. 5A is used to laterally extend the extendable ski device from position 12 to position 13 in FIG. 1D. The extendable ski device is extendable when the rotation angle of the landing wheels 25 is at positions a and b in FIG. 2D, and the speed of the bike is 60 km/h or less. The extendable ski device contracts for safety when the speed is higher than a set speed.

The extension switch 56-1 is turned off when the landing wheel 25 is extended, and the contraction switch 57-1 is turned off when the landing wheel 25 is contracted. Both switches are turned on when the contact points of the cam 250 and the switch 57 are at positions a, b and c in FIG. 2D. The landing wheels 25 are pivoted between the lowered position and the raised position and stop at two positions that are adjusted by the limit switch 57.

The speed sensing circuit in circuit diagram 3 of FIG. 8B determines whether the vehicle is moved at a high speed, slowed down or stopped. The amperage of the speedometer 38 is measured. When the speed is higher than or equal to 60 km/h, the landing wheels are at the fully raised position. When the speed is between 15 km/h and 60 km/h, the landing wheels are at the preliminarily raised position. When the speed is between 5 km/h and 15 km/h, the landing wheels are at the semi-landing position. When the speed is between 0 km/h and 5 km/h, the landing wheels are at the full landing position.

When the amperage of the speedometer 38 rises according to increase in speed, and thus the landing wheel switch 58 is rotated to the raised position, the current is supplied from the battery to the coil 51c of the relay via a closed circuit consisting of the landing wheel switch 58 and the limit switch 57. As a result, the ON contact portion 51a is closed to operate the landing motor 31 and the solenoid. The rotational force of the landing motor 31 is transmitted to the drive gear 35b, which takes the form of a worm gear, via the reduction gear unit 35. Then, the driven gear 35a in the form of a worm gear engaged with the drive gear 35b rotates a gear arranged to rotate about the camshaft 6. Thereby, the camshaft 6 is rotated and thus the cam 250 rotating about the camshaft 6 at the outer side of the cam case 24 rotates. Rotation of the cam 250 and the action of the pull spring 251 cause the landing wheel arm 7 to pivot such that the landing wheels 25 are pivoted.

Figure 2E:
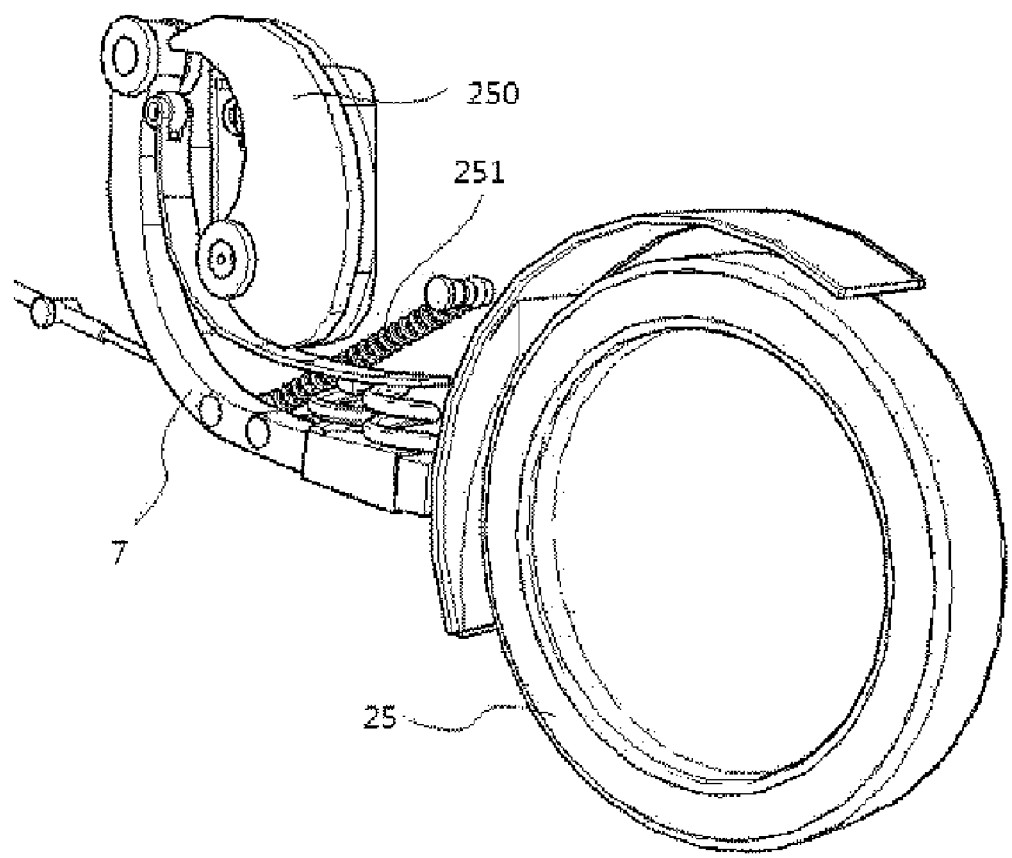
FIGS. 2E and 2F are perspective views showing an automatic landing wheel apparatus provided to a bike according to a second embodiment of the present invention.
Figure 2F:
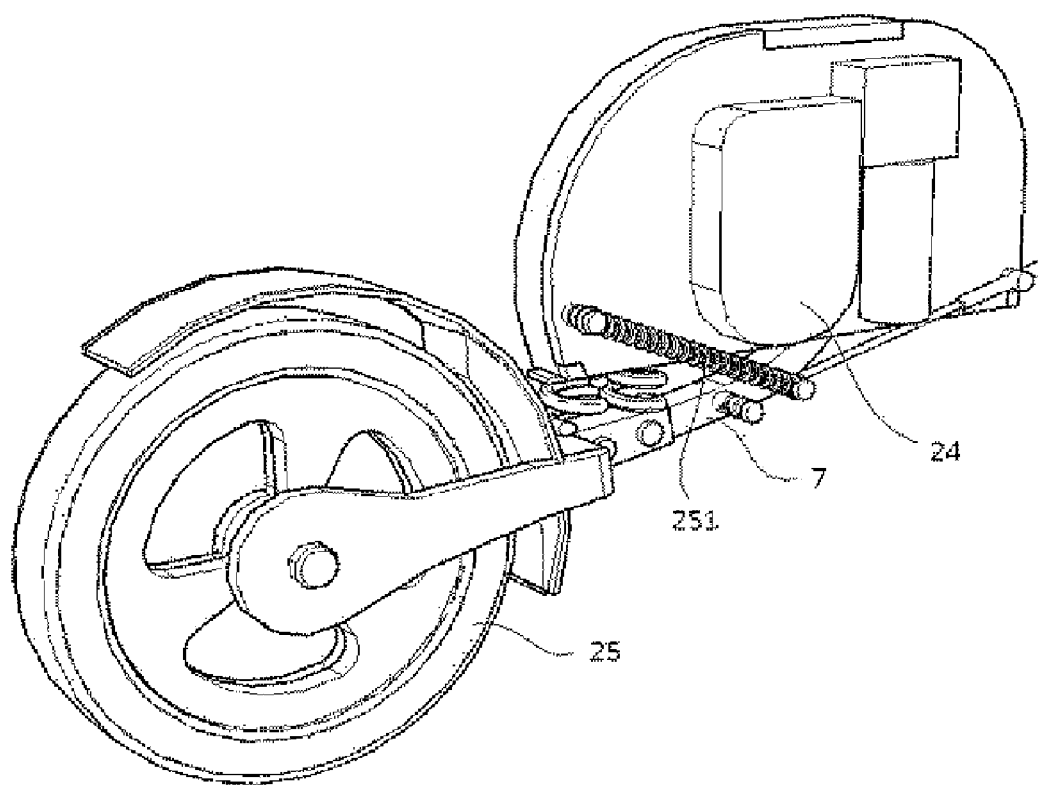

As shown in FIG. 2F, one end of the pull spring 251 is hinged to the inner surface of the cam case 24, and the other end of the pull spring is hinged to the inner surface of the lower portion of the landing wheel arm 7. Thus, the pull spring exerts pulling force on the landing wheels 25 upward. Thus, when the cam 250 rotates and pushes the landing wheel arm 7, the landing wheels 25 are lowered. When the cam 250 rotates to the opposite position and thus the force pushing the landing wheels 25 is removed, the landing wheels 25 are raised by the action of the pull spring 251 in proportion to the rotation of the cam 250 to the opposite position.

The pivoting motion driven by the landing motor 31 is stopped when the limit switch 57 detects complete rise of the landing wheels 25. When the bike is in the standing state, in which the bike is stopped, the solenoid 39 and the landing motor 31 are turned off, and then the standing state is maintained by the safety clamp wire connected with the foot brake. When the bike is turned on and power is supplied, the landing wheels 25 may return to the drive preparation step.

The landing wheels 25 can be returned to the raised position by the landing motor 31. When the limit switch 57 is ON, the landing wheel arm 7 is rotated to the raised position. The relay 53 is operated to close the ON contact portion 53a. As a result, the current flows to the landing motor 31 on the opposite side and the landing wheels 25 are pivoted to the raised position.

As shown in circuit diagram 1 and circuit diagram 2, if the speed of the bike is 0 km/h, the vertical angle of the bike is in the range of 0 to 2 degrees and the landing wheels 25 are at the fully lowered position, the power to the bike is ready to be cut off and the limit switch 57 interrupts the current flow to the landing motor 31. The power interruption is affected only when the throttle switch 58t is at the ON position and the vehicle is stopped.

The speed sensing circuit of the bike is located between the speedometer 38 and the landing wheel switch 58. The speed sensing circuit operates when the bike speed decreases to a preset limit value or less. When the speed sensing circuit is operated, the motor pivots the landing wheels 25.

The landing wheels 25 are driven to rise when the speed of the bike is higher than or equal to a set value in the ON state of the automatic switch. The landing wheels 25 are driven to descend when the speed of the bike is less than or equal to a set value.

Although an NC relay driven by an AC generator is illustrated in the circuit diagram in FIG. 8B as being used, a DC relay can also be used. When the bike speed drops below the set value, allowable power is applied such that the landing wheels 25 are lowered. The NC contact portion 92 is connected to the battery via the forced landing switch 59 and the fuse 60 and is connected to the transfer contact portion 55c via the DC relay.

According to the above-described configuration, the landing wheel arm 7 and the landing motor 31 are connected such that the operation of the automatic landing wheel apparatus is performed based on the speed increase/decrease of the bike speedometer 38. In addition, the connection operation is performed by a control circuit, and accordingly the landing wheels 25 and the landing motor 31 can be connected or disconnected directly by the control circuit. In particular, the automatic operation mode of the control circuit is operatively connected with change in speed of the bike. Therefore, if the control circuit is not operated due to failure or the like, the landing wheels 25 can be manually operated using the up/down switch without disassembling the apparatus.

Further, since the structure allows the control circuit to be operated by operation of the driver, the driver can recognize the operation, and operational stability of the landing wheels 25 can be further enhanced.

In the first embodiment illustrated in FIGS. 2A to 2C, in driving the landing wheels 25 mounted so as to maintain the lateral safety distance, which is the distance between the left and right landing wheels 25, to maintain the bike at the upright position, several sheets of leaf springs 19 are stacked to function as a shock absorbing means in order to cope with the ground surface, which momentarily varies. The number of stacked leaf springs 19 can be adjusted depending on the weight of the bike.

In order for the leaf springs 19 to be arranged on the landing wheel arm 7 to function as a shock absorbing means, the landing wheel arm 7 is gradually lowered from the rotation shaft of the landing wheel arm 7 and is suddenly bent backward, thereby having an L-shape or a C-shape. The leaf springs 19 are inserted into the bent portion of the landing wheel arm 7 which is bent in the L-shape or a C-shape. The lower end of the leaf springs 19 is fixedly engaged with the lower portion of the bent portion of the landing wheel arm 7 and the upper end of the leaf springs 19 is a free end that is positioned close to the upper portion of the bend portion of the landing wheel arm 7, but is not engaged with the upper portion. The leaf spring 19 is installed so as to be inclined obliquely downward as it extends from the front side to the rear side in the inside of the bent portion.

The leaf spring 19 is a shock absorbing means for allowing the landing wheel arm 7 in the vertical position to move smoothly in the up-and-down direction. It is also possible to use a coil spring instead of the leaf spring 19 as the shock absorbing means.

Reference numerals 19-1, 19-2, 19-3, and 19-4 in FIG. 2A denote leaf springs that are arranged side by side. When the landing motor 31 is driven, the cam 250 rotates to push the leaf spring 19-1, which is in contact with the cam 250. When the load applied to the leaf spring is small, only the leaf spring 19-1 at the uppermost position is pressed, and thus only one leaf spring 19-1 performs the shock absorption function to keep the bike upright. When the load applied to the leaf spring is increased by rotation of the cam 250, the first leaf spring 19-1 and the second leaf spring 19-2 are both pressed. When the largest load is applied, all the leaf springs 19-1, 19-2, 19-3 and 19-4 are pressed to most strongly attenuate shock.

In the case of the second embodiment shown in FIGS. 2E and 2F, in driving the landing wheels 25 for maintaining the upright position, the shock absorbing means composed of leaf springs and a coil spring necessary for coping with momentary changes of the ground is provided in each of the left landing wheel apparatus and the right landing wheel apparatus.

In order to mount each shock absorbing means on the landing wheel arm 7, it is necessary to form a clearance for mounting the shock absorbing means on the landing wheel arm 7. Accordingly, the landing wheel arm 7 is bent in an L-shape or a C-shape to form a bent portion and the shock absorbing means is installed inside the bent portion.

In the shock absorbing means, the lower end of the coil spring is engaged with the upper surface of the lower end portion, namely the free end, of the landing wheel arm 7 such that the left and right landing wheel arms 7 which are in the vertical position can be smoothly driven in the vertical direction. The leaf springs are bent in in an L-shape or a C-shape similar to the shape of the landing wheel arm 7 and are arranged above the landing wheel arm 7 with a narrow gap formed between the leaf springs and the landing wheel arm 7. The upper end of the leaf springs is hinged to a portion adjacent to the rotation shaft of the landing wheel arm 7 and the lower end, namely the free end, of the leaf springs is engaged with the upper end of the coil spring. Thus, the coil spring functions to absorb shock between the leaf springs and the landing wheel arm 7.

When the cam 250 rotates in the forward direction to press down the leaf springs, the leaf springs and the coil spring press down the landing wheel arm 7. Then, the landing wheel arm 7 is rotated downward. When the cam 250 rotates in the reverse direction, the landing wheel arm 7 is pulled upward by the pull spring 251, and is thus raised.

When the bike maintaining the upright position encounters severely uneven terrain, the left and right landing wheels 25 need to be lowered differently. As a means to cope with irregular terrain, an automatic upright position control/maintenance system is provided.

Figure 3A:
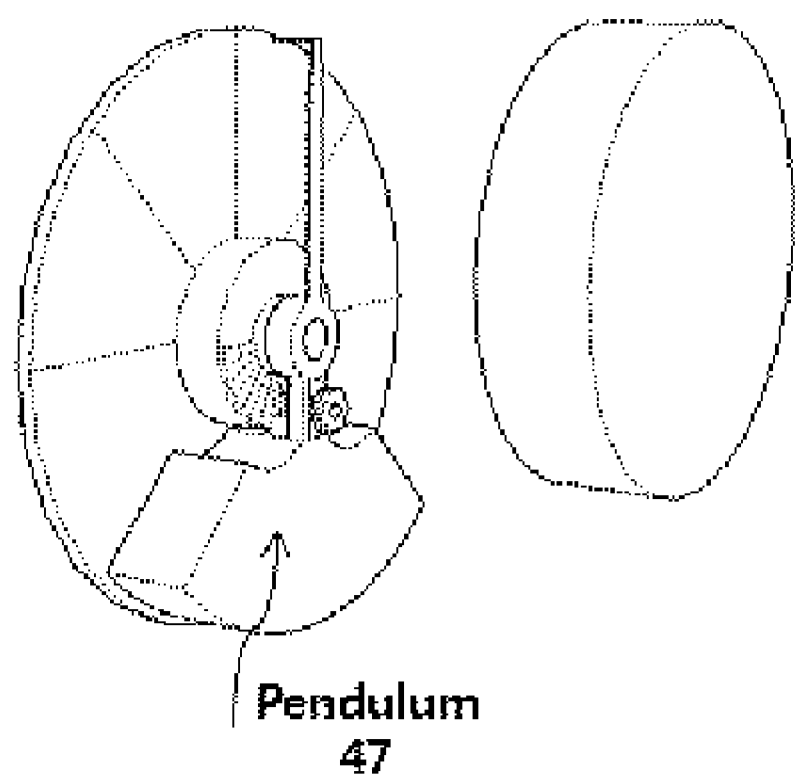
FIGS. 3A to 3C are perspective views showing an automatic vertical position control/maintenance system of a bike having an automatic landing wheel apparatus according to the present invention.
Figure 3B:
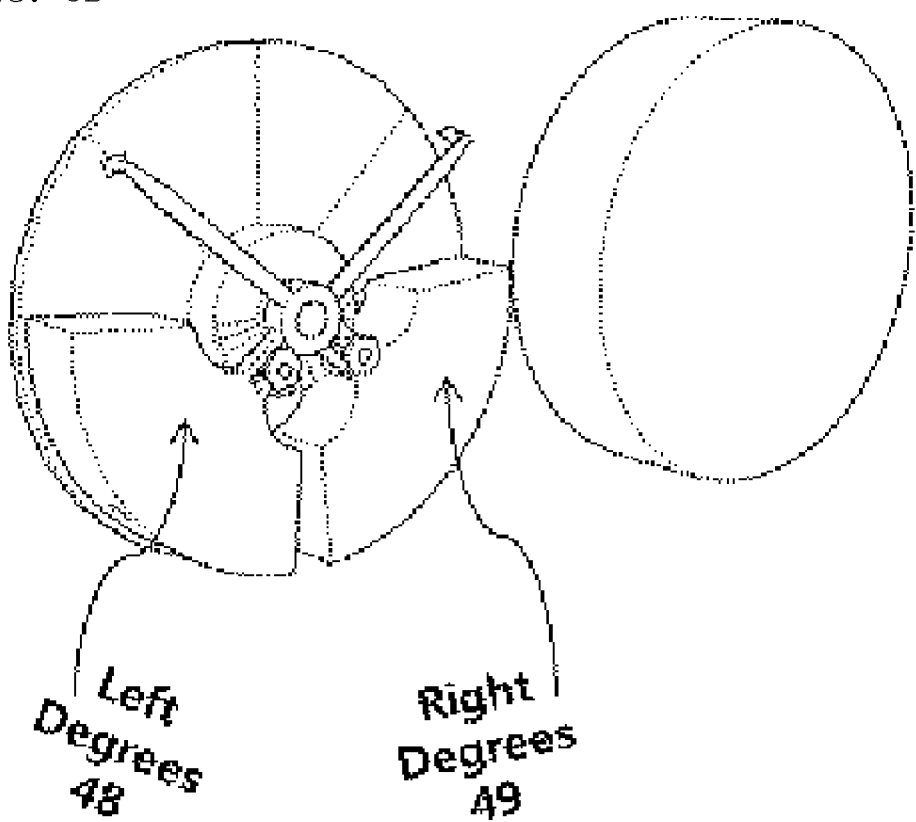

As shown in FIG. 3A, a pendulum 47 and an electrode rod 43, which are coupled to each other to move integrally, are rotatably coupled to the center of the automatic upright position control/maintenance system, and the pendulum 47 and the electrode rod 43 are automatically rotated and always positioned on the vertical line even if the bike is tilted to the left side or the right side by the weight of the pendulum 47.

Figure 3C:
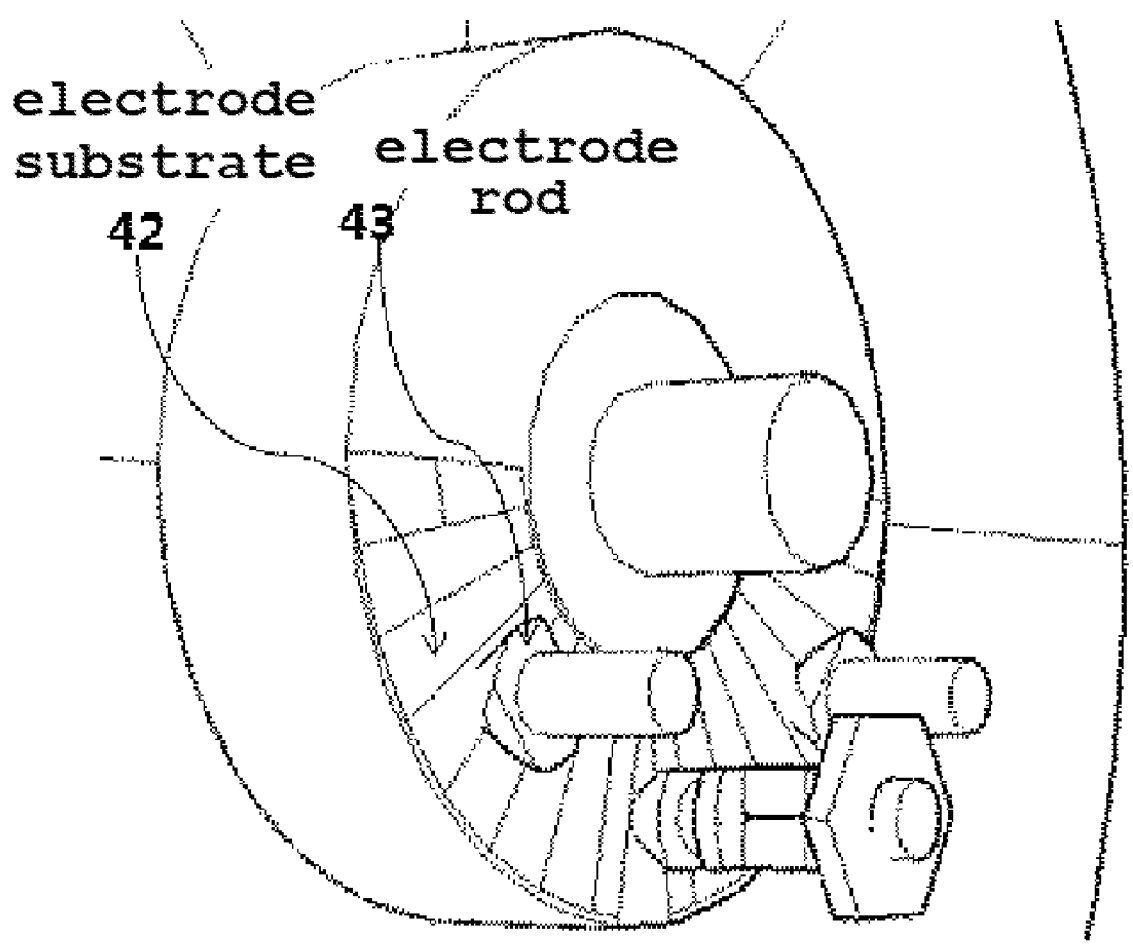
Figure 3D:
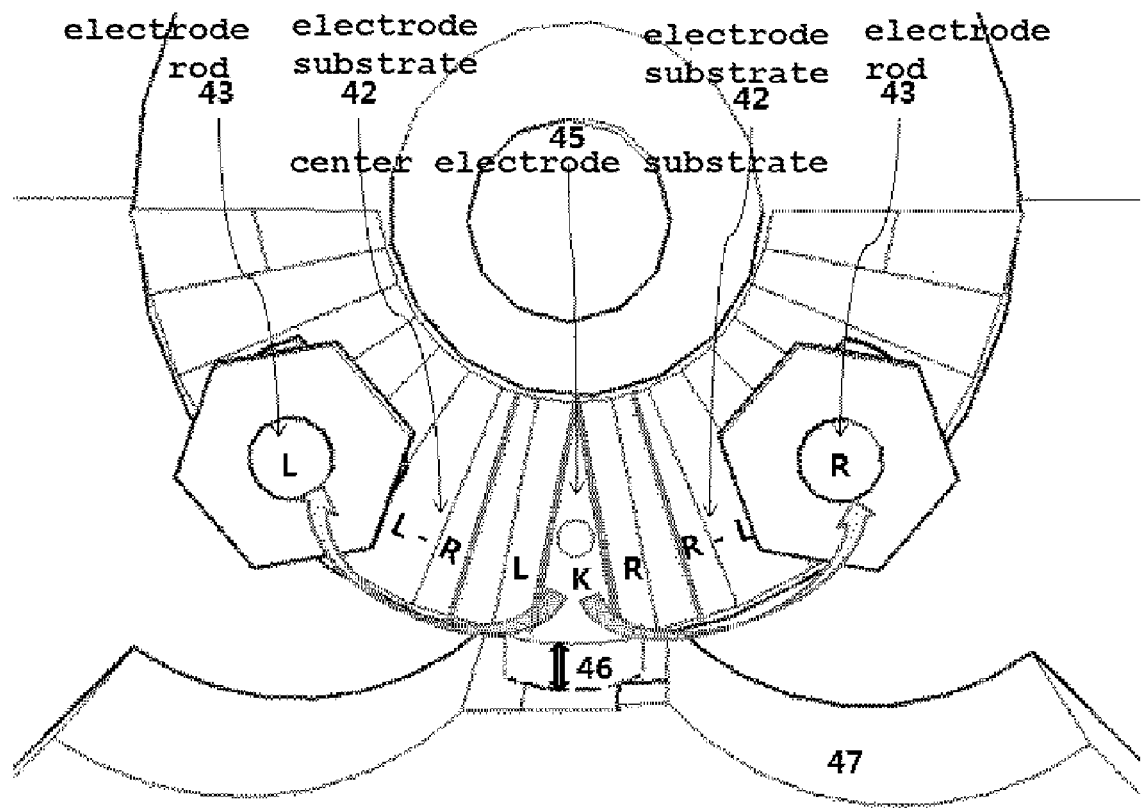
FIG. 3D is a front view showing the automatic vertical position control/maintenance system of a bike having an automatic landing wheel apparatus according to the present invention.

As shown in FIGS. 3C and 3D, electrode substrates and a center electrode substrate 45 are combined to form a semicircular shape. The center electrode substrate 45, which is located at the center between the left and right sides, is arranged in an arc shape at the lowermost position. The electrode substrates 42 are arranged in series on each of the left and right sides of the center electrode substrate 45. The electrode substrate 42 and the center electrode substrate 45 are formed by five separate copper plates. As shown in FIG. 3D, the substrates are divided into five regions: region K, region L, region R, region L-R, and region R-L.

The electrode rod 43 is a copper electrode rod. The electrode rod 43 is brought into contact with the front surface of an electrode substrate in any one of the five regions. When electricity is applied to the electrode substrate which is in contact with the electrode rod 43, the degree of tilt of the bike is sensed.

When the electrode rod 43 enters region K in the center electrode substrate 45 at an angle within 2° from the vertical line with respect to the driver, the left and right landing motors 31 are driven together to lower both left and right landing wheels to the ground at the same time. Thereby, the upright position of the bike is maintained within a range of 0° to 2°.

As shown in FIG. 3D, when the bike is inclined to the left to form a vertical angle between 2° and 5° and thus the electrode rod 43 enters region L, the landing motor 31 on the left side is driven as the switch (s/w) of the automatic upright position control/maintenance system is set in the ON state, that is, the power supplied state, and the vertical angle of the bike is between 0° to 1°. On the other hand, the landing motor 31 on the right side is not driven and the switch (s/w) is set in the OFF state, that is, the power interrupted state. Accordingly, only the left landing wheel 25 is lowered to shift the tilt angle to the right to maintain the upright position.

Here, sensitivity of the tilt operating angle can be adjusted according to the user's preference, using an adjustment rod mounted on the pendulum 47 of the automatic upright position control/maintenance system.

When the bike is inclined to the left to form a vertical angle greater than or equal to 5' and thus the electrode rod 43 enters region L-R, the landing motor 31 on the left side is set in the switch (s/w) ON state of the automatic upright position control/maintenance system, and is thus driven to set the vertical angle in a range between 0' and 1'. On the other hand, the landing motor 31 on the right side rotates counterclockwise (ccw) such that the right landing wheel 25 rises to correspond to the ground surfaces on the left and right sides of the bike. At this time, the right landing wheel 25 is maintained to be flexible as it is affected by the tensional force of the leaf spring 19. At this time, the right landing motor is set in the switching (s/w) ON state to rotate counterclockwise (ccw) in the power supplied state. Thereby, the landing motor 31 on the right side shifts the tilt angle to the right. When the tilt angle re-enters the region of the center electrode plate 45, which is between 0' and 2', according to the above operations, the automatic upright position control/maintenance system performs switching to rotate the motor clockwise (cw). Thereby, the landing wheels 25 are brought into close contact with the ground and the bike automatically maintains the upright position.

That is, when the bike passes over, for example, a depressed portion of a road and thus the bike is inclined to form a vertical angle greater than or equal to 2', it is necessary to lower a landing wheel 25 on one side more than when the landing wheels 25 are fully landed on flat ground. In addition, if the bike is inclined to one side to form a vertical angle greater than or equal to 5', this means that the bike is passing a road surface that is significantly tilted. Accordingly, in this case, one landing wheels 25 is lowered to touch the ground surface, and the landing wheel 25 on the opposite side is raised so as to keep the bike as close to the upright position as possible.

When the bike is inclined to the right side to form a vertical angle between 2' to 5' and thus the electrode rod 43 enters region R, the landing motor 31 on the right side is set in the switch (s/w) ON state of the automatic upright position control/maintenance system, that is, the power supplied state, and is thus driven to set the vertical angle of the bike in a range between 0' and 1'. On the other hand, the landing motor 31 on the left side is not driven but is set in the switch (s/w) OFF state, that is, the power interrupted state. Accordingly, only the landing wheel 25 on the right side is lowered to shift the tilt angle to the left side to maintain the upright position.

When the bike is inclined to the right to form a vertical angle greater than or equal to 5' and thus the electrode rod 43 enters region R-L, the landing motor 31 on the right side is set in the switch (s/w) ON state of the automatic upright position control/maintenance system, and is thus driven to set the vertical angle in a range between 0' and 1'. On the other hand, the landing motor 31 on the left side rotates counterclockwise (ccw) such that the left landing wheels 25 rises to correspond to the ground surfaces on the left and right sides of the bike. At this time, the left landing wheel 25 is maintained to be flexible as it is affected by the tensional force of the leaf spring 19. At this time, the left landing motor is set in the switch (s/w) ON state to rotate counterclockwise (ccw) in the power supplied state. Thereby, the left landing motor 31 shifts the tilt angle. As a result, when the tilt angle re-enters the region of the center electrode plate 45, which is between 0' and 2', the automatic upright position control/maintenance system performs switching to rotate the motor clockwise (cw). Then, the landing wheels 25 are brought into close contact with the ground and the bike automatically maintains the upright position.

Figure 4A:
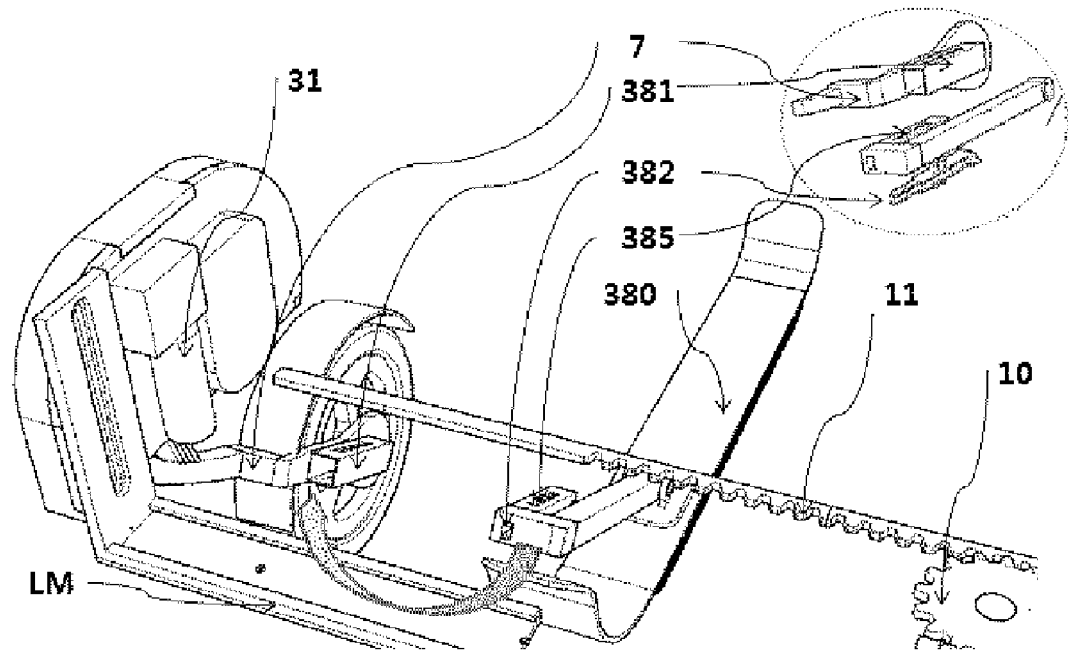
FIGS. 4A to 4C are perspective views showing bike skis and an extension device of a bike having an automatic landing wheel apparatus according to the present invention.
Figure 4B:
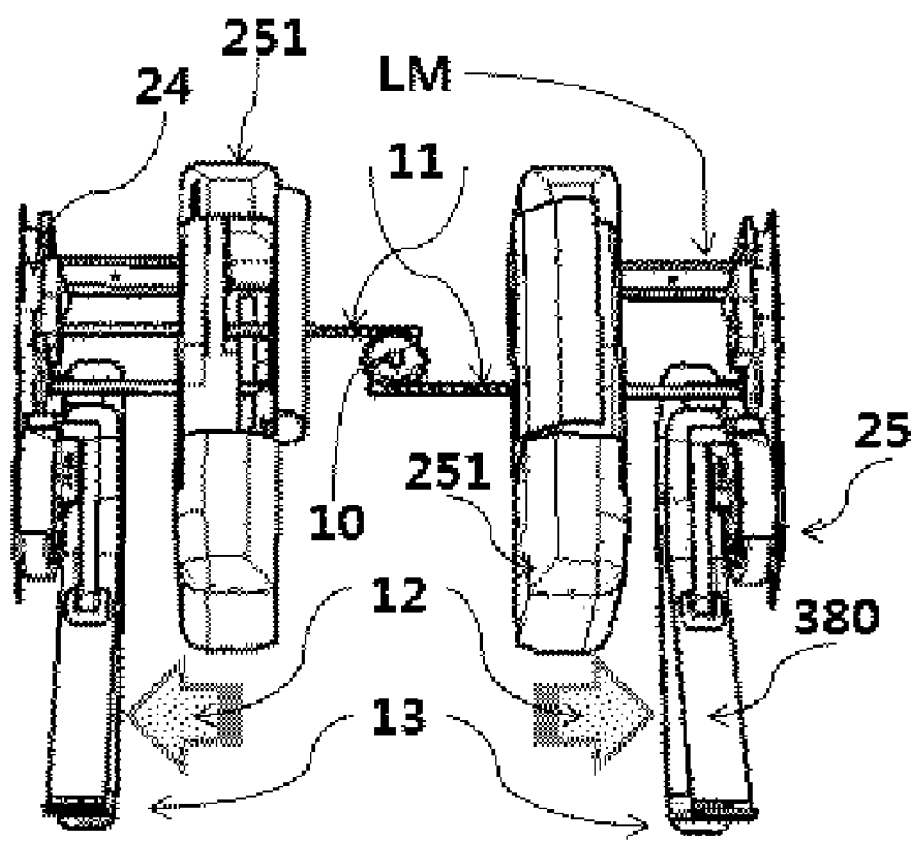
Figure 4C:
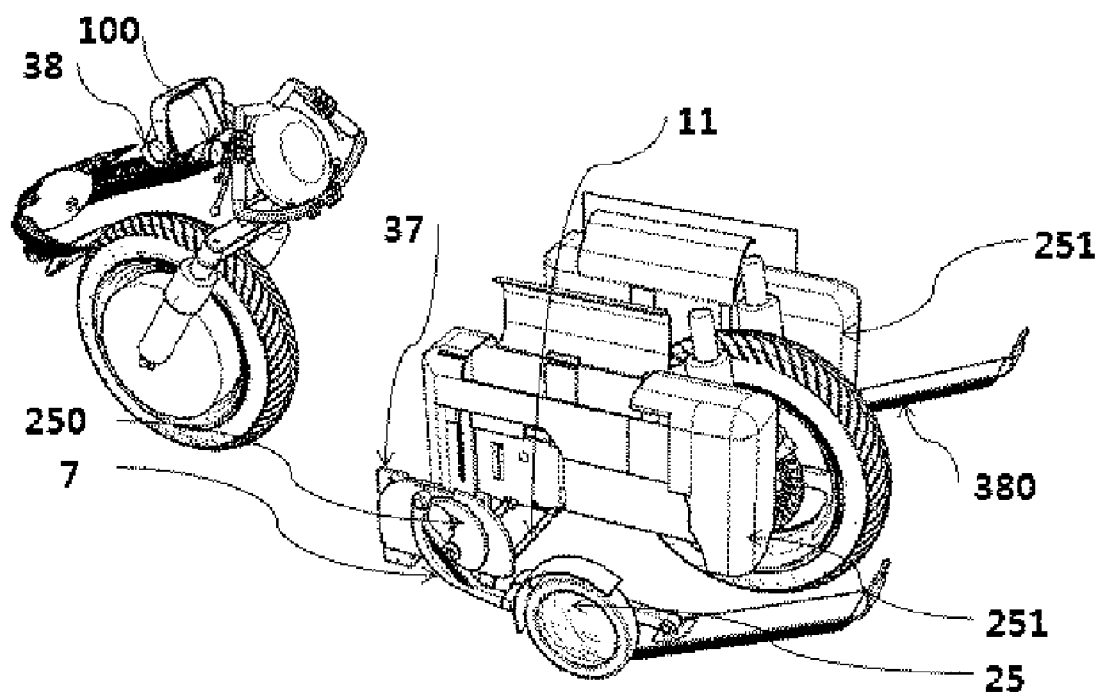

FIG. 4B shows the left and right landing wheels 25 configured to be extended and contracted between the positions denoted by reference numerals 12 and 13 by the rack 11 and the pinion 10. The left and right landing wheels 25 can be automatically extended by the pinion 10 and the motor mounted thereon, or the extension can be manually operated by turning off the extension switch 56-1 and the contraction switch 57-1. The rack 11 includes a left rack and a right rack. The left end of the right rack 11 engages with the left automatic landing wheel apparatus and the right end of the left rack 11 engages with the right automatic landing wheel apparatus. Thus, when the pinion 10 rotates, the left and right racks 11 are simultaneously operated to widen or narrow the gap therebetween. When the gap between the left and right racks 11 is maximally narrowed, the left and right automatic landing wheel apparatuses are housed inside the side trunk 252.

The ascending and descending movements of the automatic landing wheel apparatus are sufficient to cope with most common road surfaces. However, when the bike is driven or parked on very unusual terrain, such as muddy or mountain roads or unstable slopes, the safe distance between the left and right landing wheels 25 can be further increased with a single button to provide a safe angle greater than the normal safety angle. Thereby, a safety angle for ensuring that the bike will not fall can be provided even if the landing motors 31 fail.

The side trunk 252 provided below both side portions of the canopy body has a space that can accommodate the automatic landing wheel apparatuses. The side trunk 252 is provided on each of the left and right sides, and is penetrated by an LM guide LM, which extends a long distance in a lateral direction. The LM guide LM serves as a guide for allowing the automatic landing wheel apparatuses to move linearly in the left and right directions when the automatic landing wheel apparatuses move left and right according to movement of the rack 11.

Figure 6:
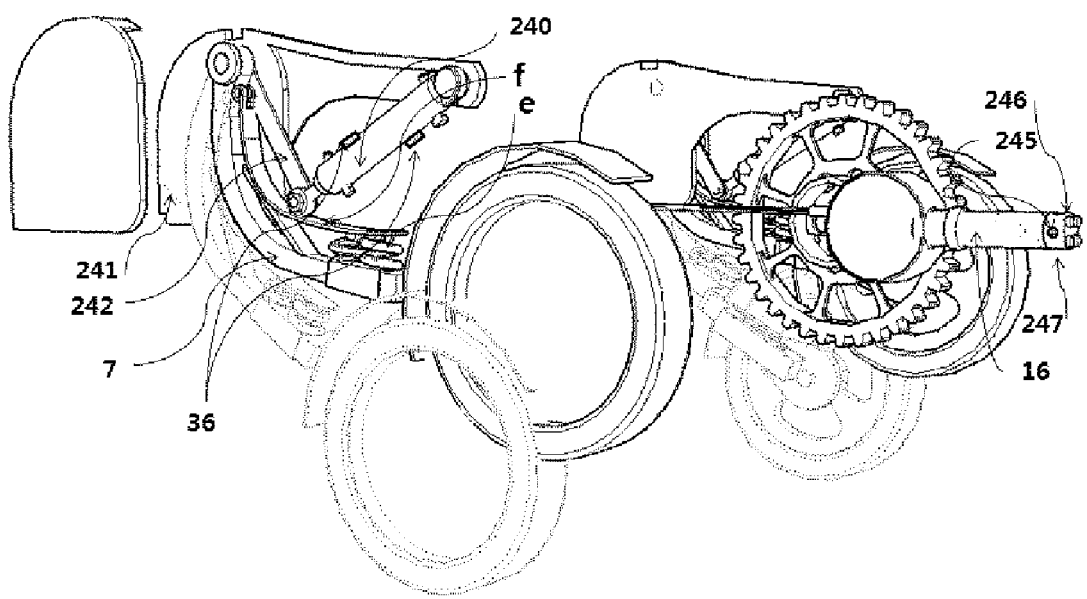
FIG. 6 is a perspective view of the automatic landing wheel apparatus provided to a bike according to the third embodiment of the present invention.

FIG. 6 shows a landing wheel arm mechanismdriven by an air cylinder according to a third embodiment of the present invention.

In the embodiment described above, the landing wheel arm 7 is driven by the landing motor 31 capable of rotating in the forward and reverse directions. In the second embodiment, however, the landing wheel arm 7 is driven by a cylinder 240 using compressed air from a tank in which air is stored, or hydraulic fluid.

The cylinder-type driving system is operated by compressed air or hydraulic fluid supplied from the cylinder 240, and therefore requires additional facilities. To this end, a compressor and an air tank are provided to not only supply compressed air but also to recover energy to be used for various purposes, as well as to simplify the mechanism.

In the third embodiment, when the bike is inclined to the left to form a vertical angle between 2° and 5° and thus the electrode rod 43 enters region L, the air solenoid valve of the cylinder driving the left landing wheel arm 7 is driven. Then, the switch (s/w) is set in the ON state, namely the power supplied state, and thus power is supplied to set the vertical angle of the bike in a range between 0° and 1°. Thereby, the piston rod of the cylinder 240 driving the left landing wheel arm 7 is pushed and lowered to press the leaf springs. On the other hand, the air solenoid valve of the cylinder for driving the right landing wheel arm 7 is not operated and the corresponding switch (s/w) is set in the OFF state, that is, the power interrupted state. Thereby, only the left landing wheel 25 is lowered to shift the tilt angle to the right to maintain the upright position.

When the bike is inclined to the left to form a vertical angle greater than or equal to 5' and thus the electrode rod 43 enters region L-R, the air solenoid valve of the cylinder for driving the left landing wheel arm 7 is switched (s/w) on and is driven to set the vertical angle in a range between 0' and 1'. At this time, the air solenoid valve of the cylinder for driving the right landing wheel arm 7 is also operated. Thereby, the piston rod is raised until it is sensed by the proximity sensor 36, and the right landing wheel 25 is raised by the action of the pull spring. At this time, the right landing wheel 25 is maintained to be flexible as it is affected by the tensional force of the leaf spring.

When the electrode rod 43 of the automatic upright position control/maintenance system re-enters the region of the center electrode plate 45, which is between 0' and 2', according to the above operations, the automatic upright position control/maintenance system is switched to apply pressure for forward movement to both cylinders. Thereby, the landing wheels 25 are brought into close contact with the ground and the bike automatically maintains the upright position.

When the bike is inclined to the right side to form a vertical angle between 2' and 5' and thus the electrode rod 43 enters region R, the air solenoid valve of the cylinder driving the right landing wheel arm 7 is driven. Then, the switch (s/w) is set in the ON state, namely the power supplied state, and thus power is supplied to set the vertical angle of the bike in a range between 0° and 1°. Thereby, the piston rod of the cylinder 240 driving the right landing wheel arm 7 is pushed and lowered to press the leaf springs. On the other hand, the air solenoid valve of the cylinder for driving the left landing wheel arm 7 is not operated and the corresponding switch (s/w) is set in the OFF state, that is, the power interrupted state. Thereby, only the right landing wheel is lowered to shift the tilt angle to the right to maintain the upright position.

When the bike is inclined to the right to form a vertical angle greater than or equal to 5' and thus the electrode rod 43 enters region R-L, the air solenoid valve of the cylinder for driving the right landing wheel arm 7 is switched (s/w) on and is driven to set the vertical angle in a range between 0' and 1'. At this time, the air solenoid valve of the cylinder for driving the left landing wheel arm 7 is also operated. Thereby, the piston rod is raised until it is sensed by the proximity sensor 36, and the left landing wheel 25 is raised by the action of the pull spring. At this time, the left landing wheel 25 is maintained to be flexible as it is affected by the tensional force of the leaf spring 19.

When the electrode rod 43 of the automatic upright position control/maintenance system re-enters the region of the center electrode plate 45, which is between 0' and 2', according to the above operations, the automatic upright position control/maintenance system is switched to apply pressure for forward movement to both cylinders. Thereby, the landing wheels 25 are brought into close contact with the ground and the bike automatically maintains the upright position.

The third embodiment is different from the second embodiment in that driving is performed not by the cam but by the cylinder according to configuration of the automatic landing wheel apparatus, but includes a shock absorbing means composed of leaf springs and a coil spring as in the second embodiment. Thus, description of the shock absorbing means will be omitted.

A driver traveling on mountain or downhill roads mainly uses engine braking to prevent brake pad failure. This is not economical because it consumes energy while decelerating. As shown in FIG. 7B, when the wire 15 is pulled by depressing the brake, the compressor support portion 181 performs hinge movement and the rotary wheel coupled to the rotary wheel shaft penetrating the compressor support portion 181 is rotated while rubbing against the drive wheel 180, which is coupled to and rotated together with the rear wheel drive shaft pulley 253. Thereby, the connecting cam 179 integrally formed with the rotary wheel shaft also rotates, thereby reciprocating the connecting cam 179, which protrudes forward of the compressor, back and forth. Then, the piston coupled with the rear end of the connecting rod 248 compresses the air introduced into the cylinder through the intake port 245 provided at the rear end of the cylinder such that the air is discharged through the exhaust port 246, which is provided at the rear end of the cylinder.

One of the shafts protrudes from both sides of the connecting cam 179. One of the shafts is the rotary wheel shaft, and is coupled to the rotary wheel 29, and the other shaft is rotatably coupled to the hole at a terminal end of the connecting rod 248.

The exhaust port 246 is connected to the air hose, and thus the compressed air is stored in the air tank 175 through the air hose. The air stored in the air tank can be used as compressed air required for driving the landing wheel arm mechanism driven by the air cylinder according to the third embodiment and can be used to provide driving force for other devices equipped to the bike.

Figure 5B:
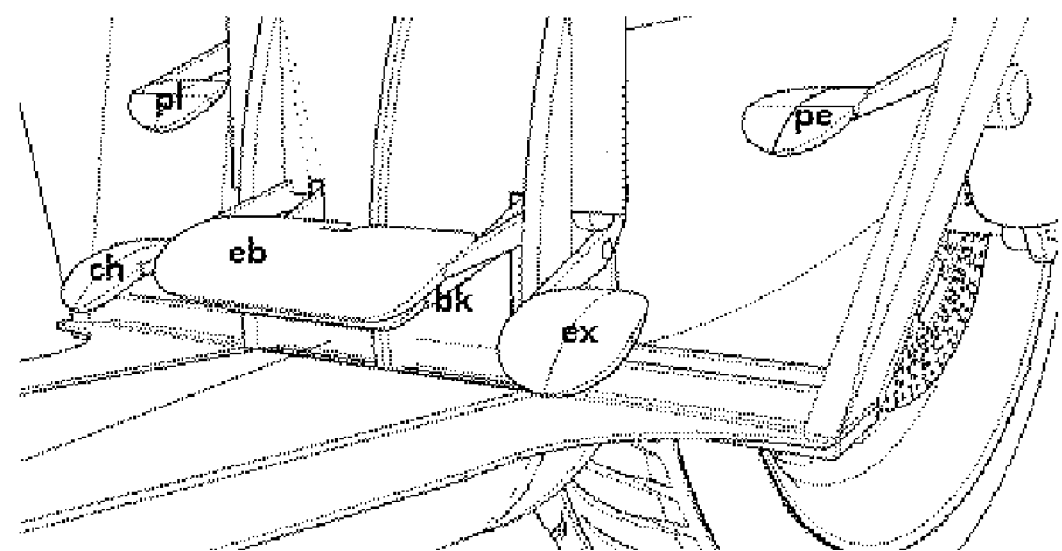
FIG. 5B is a perspective view showing a pedal portion of a bike having an automatic landing wheel apparatus according to the present invention.

The operation of pulling the wire 15 to make the rotary wheel 29 and the drive wheel 180 contact each other may be performed by manually operating the hand lever 13 shown in FIG. 5A, or by depressing the foot deceleration pedal eb shown in FIG. 5B using a foot.

When the compressor is used to recover energy and gradually decelerate, the foot deceleration pedal eb is depressed slightly such that the brake bk under the foot deceleration pedal eb does not descend. In performing sudden braking, the foot deceleration pedal eb is greatly depressed such that the brake bk under the foot deceleration pedal eb is operated.

As shown in FIG. 7B, when the compressor is moved from position 16 to position 17 by the pulling action of the wire 15 and thus the rotary wheel 29 is brought into contact with the drive wheel 180, rotational driving force is obtained. Thus, the power obtained by decelerating the bike is used to operate the compressor to compress the air and to store the air in the air tank 175 in FIG. 1A such that the air is used when necessary.

Figure 7A:
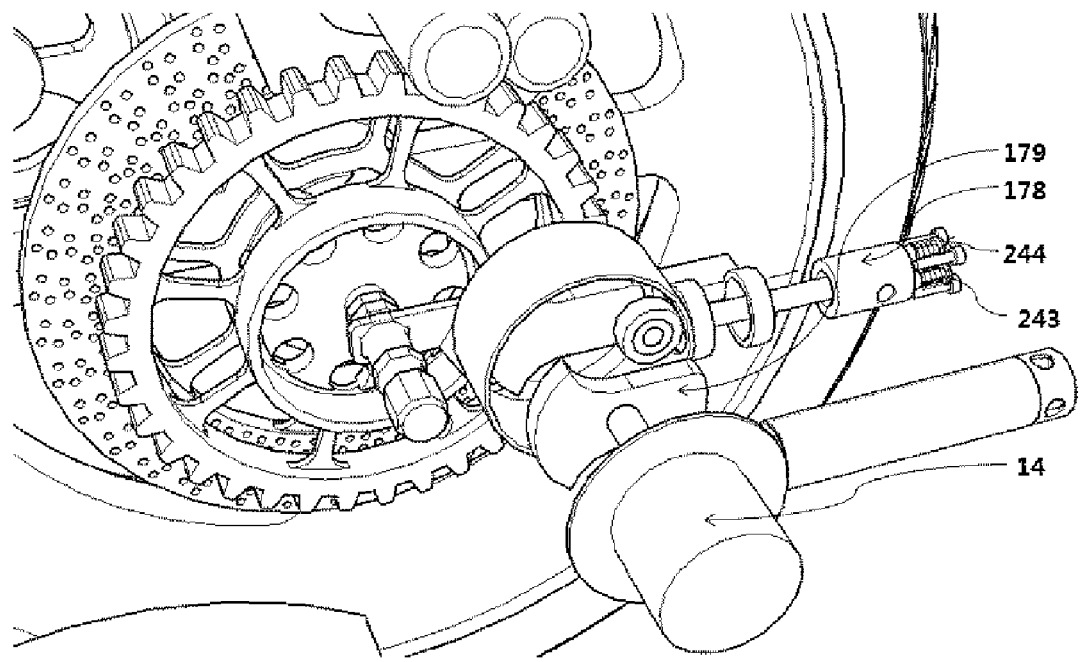
FIG. 7A to 7C are perspective views illustrating an energy recovery apparatus for the bike having the automatic landing wheel apparatus according to the third embodiment of the present invention.
Figure 7B:
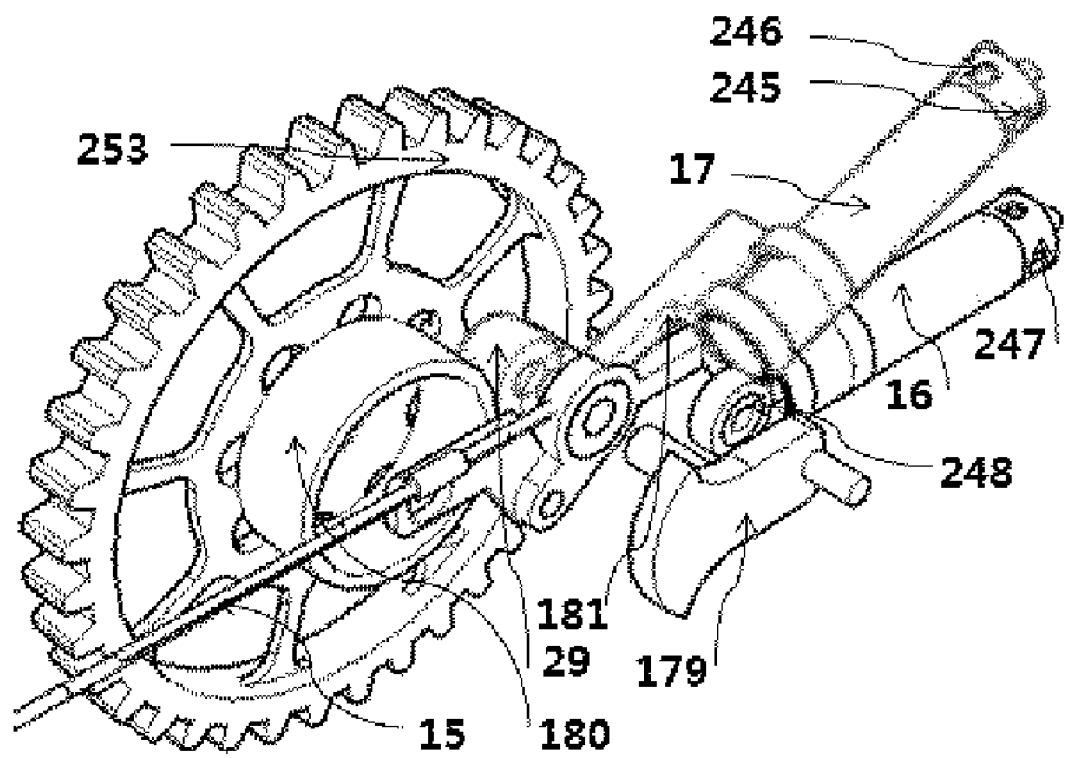
Figure 7C:
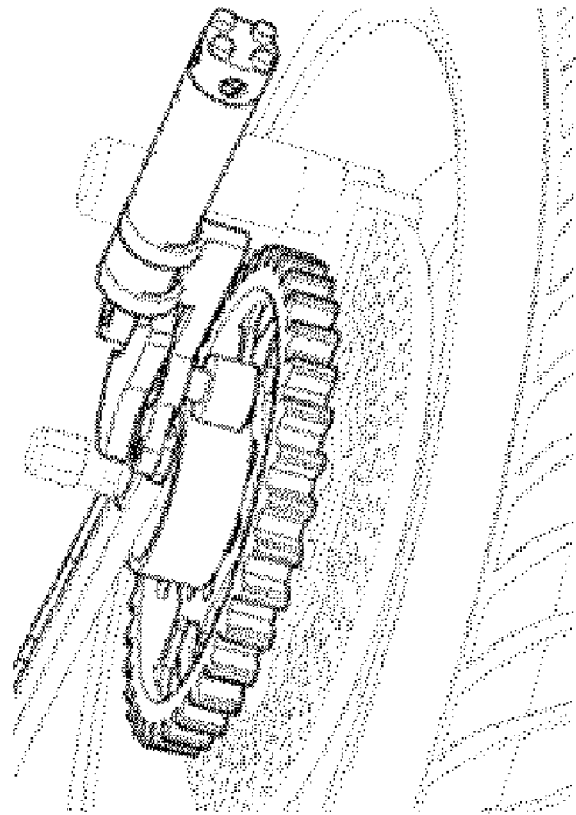

As shown in FIG. 7A, another connecting cam 179 connected to the connecting rod 248 and rotating along with rotation of the connecting rod 248 is installed outside the connecting rod. The center shaft of the connecting cam 179 installed on the outside may be connected to the generator combined motor 14 installed at the outermost side and capable of operating as a generator and thus can convert rotational force into electricity.

When the generator combined motor 14 is not in use as a generator, the generator 14 automatically rotates to reciprocate the connecting rod 248 if the pressure drops. Thereby, compressed air is generated to maintain the pressure in the air tank 175 at a predetermined value or more.

When the vehicle runs on snowy roads or icy roads, the bike ski 380 shown in FIG. 1B can be mounted and the landing wheels 25 can be extended to the left and right sides to prevent the bike running on the snowy or icy road from slipping and falling to one side or from turning over, which is critical to the bike. Thereby, a safer ride can be facilitated.

As shown in FIG. 4A, the bike ski 380 is mounted on the landing wheel arms 7 and is arranged in the space between the left and right landing wheels 25 so as to be adjacent to the landing wheels 25. The ski landing switch 68 shown in FIG. 5A can be used to land the bike ski 380 on a snowy road and an icy road at a bike speed up to 60 km/h in order to prevent the bike from falling to the left or right side.

The bike ski 380 is mounted on a square pipe-shaped ski mount socket 381, which is vertically arranged at parts of the left and right landing wheel arms 7 that are not visible from the outside. Adjustment holes penetrating the ski mount socket 381 in the front-rear direction are formed at intervals in the front and rear surfaces of the ski mount socket 381 and arranged spaced apart from each other in the vertical direction.

The bike ski 380 is a flat plate-like member similar in shape to a typical ski elongated in the front-back direction. The front and rear end portions of the bike ski 380 are curved upward and the front part of the upper surface of the bike ski 380 is coupled with the lower end portion of the ski leg. The bike ski 380 and the ski leg are hinged so as to pivot about a horizontally arranged shaft.

The upper end portion of the ski leg is curved outward in a square bracket shape to form an insertion member, which is a part extending in parallel with the ski leg. The upper surface of the insertion member is provided with a hole, and an inner space communicating with the hole is defined on the upper surface. The front and back surfaces of the insertion member are provided with multiple adjustment holes 385, which are vertically arranged spaced apart from each other so as to communicate with the inner space of the insertion member.

An elastic attachable lever 382 having an open upper end that is formed in the shape of tongs and is narrowed when pressed on both sides is detachably inserted into the upper surface hole of the insertion member. Each of the front and rear parts of the attachable lever 382 is provided with a pair of protrusions. Thus, when the attachable lever 382 stretches out with the insertion member inserted into the ski mount socket 381, the protrusions are inserted into the adjustment holes of the ski mount socket 381 and the adjustment holes of the insertion member such that the insertion member is fixed so as not to vertically move. When the attachable lever 382 is pressed and the protrusions are released from the adjustment holes 385, the insertion member can be removed from the ski mount socket 381. The installation height of the bike ski 380 can be adjusted by adjusting the insertion depth of the insertion member while the attachable lever 382 is pressed.

In a typical environment, the bike ski 380 is preferably installed about 2 to 3 mm below the landing wheels to reach the ground earlier than the landing wheels.

As such, the bike skis 380 can be easily mounted or removed using the attachable lever 382 which is economical and designed to be simple to attach and detach and highly durable. In addition, the vertical position of the bike ski 380 can be adjusted position according to the amount of snow.

Since the bike ski 380 ascends or descends when the landing wheels 25 are raised or lowered, the bike ski 380 can be easily raised and lowered on a locally intermittently frozen road surface. Therefore, the rear wheels may be prevented from slipping to the left or right side during travel, and the bike ski can be quickly raised on a ground that is not slippery, such that the bike can run at a normal speed.

If the canopy is installed, a window brush for a bike is required to secure the front view when it snows or rains. The window brush needs to be provided with a narrow width to fit the bike.

Figure 5C:
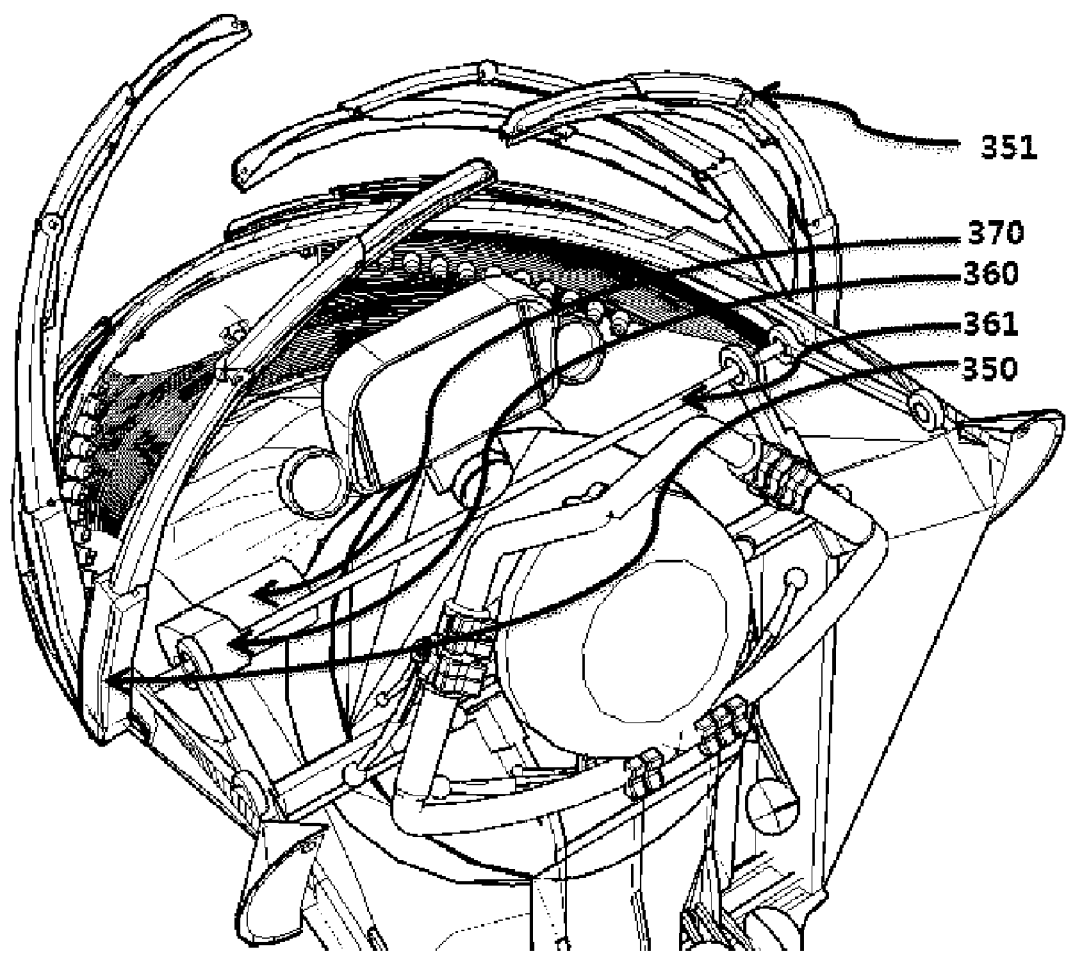
FIG. 5c is a perspective view showing a window brush of a bike having an automatic landing wheel apparatus according to the present invention.

As shown in FIG. 5C, a shaft 361 extending in the left-right direction is provided so as to be rotated in both forward and reverse directions by a brush motor 370, and both ends of the shaft 361 are connected to the left and right window brushes 350 and 351, respectively. Accordingly, the window brushes 350 and 351 on both sides are operated simultaneously using only one brush motor 370 and the speed reducer 360 rather than using two motors. They are also economically configured to be able to wipe off the outside of the spherical windshield. Therefore, a clear view can be secured for the driver during rainy weather.

It will be apparent to those skilled in the art that various modifications and variations can be made in the present invention without departing from the spirit and scope of the invention as set forth in the appended claims.

The invention claimed is:

1. A bike having an automatic landing wheel apparatus comprising:
    a left landing wheel arm provided at a left side of the bike and having a lower end portion rotatably coupled with a left landing wheel to move the left landing wheel up and down;
    a right landing wheel arm provided at a right side of the bike and having a lower end portion rotatably coupled with a right landing wheel to move the right landing wheel up and down;
    a left drive unit configured to drive the left landing wheel arm to raise and lower the left landing wheel;
    a right drive unit configured to drive the right landing wheel arm to raise and lower the right landing wheel;
    a speed sensor configured to sense a speed of the bike; and
    a controller connected to the speed sensor, the left drive unit and the right drive unit to raise both or one of the left landing wheel and the right landing wheel when a speed sensed by the speed sensor exceeds a set speed and to lower both or one of the left landing wheel and the right landing wheel when the speed sensed by the speed sensor becomes the set speed or less,
    wherein the left landing wheel arm has an upper end portion rotatably mounted on a left side portion of the bike so as to vertically rotate about a shaft extending in a horizontal direction, the right landing wheel arm has an upper end portion rotatably mounted on a right side portion of the bike so as to vertically rotate about a shaft extending in a horizontal direction, the left drive unit is configured to rotate the left landing wheel arm in forward and reverse directions, and the right drive unit is configured to rotate the right landing wheel arm in forward and reverse directions, and wherein the drive unit comprises:

a cam configured to receive driving force of a landing motor capable of rotating in forward and reverse directions and to rotate about a horizontal shaft to push and lower the landing wheel arms; and a pull spring configured to pull the landing wheel arms to raise the landing wheel arms when a shortest distance between a rotation center of the cam and the cam and the landing wheel arms is reduced.

2. The bike according to claim 1, wherein:

the bike is provided with a canopy having a space for accommodating a driver, and each of both side parts of a rear portion of the canopy comprises a side trunk providing a storage space for the automatic landing wheel apparatus.

3. The bike according to claim 2, wherein a front portion of the canopy comprises:

a windshield having an outer surface matching an outer surface of a part of a spherical body;

a pair of left and right windshield wipers curved in an arc shape so as to come into close contact with the outer surface of the windshield; and a windshield wiper driving means configured to drive the windshield wipers to reciprocate up and down.

4. The bike according to claim 3, wherein:

the automatic landing wheel apparatus comprises a left landing wheel apparatus and a right landing wheel apparatus, the left landing wheel apparatus comprises the left landing wheel arm, the left landing wheel and the left drive unit, and is coupled to a guide linearly movable to the left or right through the left side trunk so as to move to the left or right and the right landing wheel apparatus comprises the right landing wheel arm, the right landing wheel, and the right drive unit, and is coupled to a guide linearly movable to the left or right through the right side trunk so as to move to the left or right.

5. The bike according to claim 4, wherein:

a left rack is coupled to a right side of the left landing wheel apparatus and a right rack is coupled to a left side of the right landing wheel apparatus, the automatic landing wheel apparatus comprises a pinion engaging with the left rack and the right rack, and a motor configured to drive the pinion, and the motor is driven to bring the left landing wheel apparatus and the right landing wheel apparatus close to or away from each other at the same time.

6. Bike according to claim 1, wherein the drive unit further comprises:

an air cylinder device capable of raising or lowering a piston rod according to an electric signal, the air cylinder device being configured to lower the landing wheel arms when the piston rod is lowered to push the landing wheel arms; and a pull spring configured to pull the landing wheel arms to raise the landing wheel arms when the piston rod rises.

7. The bike according to claim 1, wherein:

each of the landing wheel arms has a bent portion having a part bent to have an L shape or a C shape between an upper end portion and a lower end portion of the bent portion, and an inside part of the bent portion is provided with a shock absorbing means such that the shock absorbing means contacts the cam.

8. The bike according to claim 7, wherein the shock absorbing means is a leaf spring having one end coupled to a corresponding one of the landing wheel arms and an opposite end, the opposite end being a free end.

9. The bike according to claim 8, wherein the leaf spring has a plurality of leaf springs arranged in parallel.

10. The bike according to claim 7, wherein the shock absorbing means comprises:

a leaf spring having an upper end portion hinged to the upper end of a corresponding one of the landing wheel arms, the leaf spring being formed in a curved shape along a curvature of the corresponding one of the landing wheel arms; and a coil spring having an upper end coupled to a lower end portion of the leaf spring and a lower end coupled to the corresponding one of the landing wheel arms, the coil spring being elastically arranged between the leaf spring and the corresponding one of the landing wheel arms.

11. The bike according to claim 1, further comprising:

an automatic upright position control/maintenance system configured to measure a degree of inclination of the bike to a left side or a right side with respect to an upright position of the bike, wherein:

the automatic upright position control/maintenance system and the controller are connected to each other, and the controller lowers only the left landing wheel when the bike is inclined to the left side by a predetermined angle or more and lowers only the right landing wheel when the bike is inclined to the right side by the predetermined angle or more.

12. The bike according to claim 11, wherein:

when the bike is further inclined to the left side by a preset angle after the left landing wheel is lowered according to inclination of the bike to the left side by the predetermined angle or more, the controller raises the right landing wheel and when the bike is further inclined to the right side by the preset angle after the right landing wheel is lowered according to inclination of the bike to the right side by the predetermined angle or more, the controller raises the right landing wheel.

13. The bike according to claim 11, wherein the automatic upright position control/maintenance system comprises:

a pendulum coupled to a rotation shaft so as to be freely rotatable left or right and kept positioned on a vertical line even if the bike is tilted by a weight thereof;

an electrode rod coupled to the pendulum to move together with the pendulum;

a center electrode plate fixedly installed on the bike so as to contact the electrode rod when the bike is positioned upright; and an electrode substrate arranged in series on a left side or right side of the center electrode plate and fixedly installed on the bike to make a contact with the electrode rod when the bike is inclined leftward and rightward by a certain angle or more, wherein:

the electrode rod contacts the center electrode plate within a certain range of inclination with respect to the upright position of the bike, and the electrode substrate comprises a plurality of electrode substrates, and the electrode substrate contacting the electrode rod varies among the plurality of electrode substrates according to a degree of inclination of the electrode rod, such that a degree of inclination of the bike is identified.

\* \* \* \* \*